US009665028B2

(12) United States Patent
Arimura et al.

(10) Patent No.: US 9,665,028 B2
(45) Date of Patent: May 30, 2017

(54) ELECTROPHOTOGRAPHIC MEMBER, PROCESS CARTRIDGE AND ELECTROPHOTOGRAPHIC APPARATUS

(71) Applicant: CANON KABUSHIKI KAISHA, Tokyo (JP)

(72) Inventors: Hideya Arimura, Suntou-gun (JP); Masaki Yamada, Mishima (JP); Kazuhiro Yamauchi, Suntou-gun (JP); Satoru Nishioka, Suntou-gun (JP)

(73) Assignee: CANON KABUSHIKI KAISHA, Tokyo (JP)

(*) Notice: Subject to any disclaimer, the term of this patent is extended or adjusted under 35 U.S.C. 154(b) by 42 days.

(21) Appl. No.: 14/257,993

(22) Filed: Apr. 21, 2014

(65) Prior Publication Data

US 2014/0221184 A1 Aug. 7, 2014

Related U.S. Application Data

(63) Continuation of application No. PCT/JP2013/007280, filed on Dec. 11, 2013.

(30) Foreign Application Priority Data

Dec. 13, 2012 (JP) ................................ 2012-272393
Dec. 9, 2013 (JP) ................................ 2013-254158

(51) Int. Cl.
*B05C 1/08* (2006.01)
*B32B 15/00* (2006.01)
(Continued)

(52) U.S. Cl.
CPC ......... *G03G 15/02* (2013.01); *G03G 15/0818* (2013.01); *G03G 21/18* (2013.01); *Y10T 428/294* (2015.01)

(58) Field of Classification Search
CPC .... G03G 15/02; G03G 15/0818; G03G 21/18; Y10T 428/294; Y10T 428/31551; Y10T 428/31605
(Continued)

(56) References Cited

U.S. PATENT DOCUMENTS 2,957,832 A * 10/1960 Gmitter et al. ................. 521/52
4,322,327 A * 3/1982 Yoshimura ......... C08G 18/0819 523/130
(Continued)

FOREIGN PATENT DOCUMENTS

JP 57-5047 A 1/1982
JP 2007-297438 A 11/2007
(Continued)

OTHER PUBLICATIONS

International Search Report dated Jan. 28, 2014 in International Application No. PCT/JP2013/007280.
(Continued)

*Primary Examiner* — Thao T Tran
(74) *Attorney, Agent, or Firm* — Fitzpatrick, Cella, Harper & Scinto

(57) ABSTRACT

An electrophotographic member having a high conductivity and having high adhesiveness to other layer, and a process cartridge and an electrophotographic apparatus using the electrophotographic member as a developer carrying member are provided.

The electrophotographic member is an electrophotographic member including an electro-conductive mandrel and an electro-conductive layer, wherein the electro-conductive layer has a resin having a structure represented by the following structural formula (1), and an anion.
(Continued)

structural formula (1)

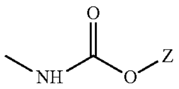

7 Claims, 2 Drawing Sheets

(51) Int. Cl.
*G03G 15/08* (2006.01)
*G03G 15/02* (2006.01)
*G03G 21/18* (2006.01)

(58) Field of Classification Search
USPC ...... 492/18; 428/379, 423.1, 425.8; 399/286
See application file for complete search history.

(56) References Cited

U.S. PATENT DOCUMENTS

| | | | | |
|---|---|---|---|---|
| 6,231,984 | B1 * | 5/2001 | Horibe | B05D 7/586 204/478 |
| 8,867,972 | B2 | 10/2014 | Suzuki et al. | |
| 2002/0128421 | A1 * | 9/2002 | Shelvey | A61L 15/12 528/58 |
| 2006/0165439 | A1 * | 7/2006 | Kawakami et al. | 399/176 |
| 2007/0123681 | A1 * | 5/2007 | Kobayashi et al. | 528/38 |
| 2007/0152193 | A1 * | 7/2007 | Isayama et al. | 252/500 |
| 2012/0134714 | A1 * | 5/2012 | Takeuchi et al. | 399/176 |
| 2012/0288306 | A1 | 11/2012 | Ikegami et al. | |
| 2013/0223893 | A1 | 8/2013 | Hayashi et al. | |
| 2014/0093278 | A1 | 4/2014 | Yamada et al. | |

FOREIGN PATENT DOCUMENTS

| | | | |
|---|---|---|---|
| JP | 2011-118113 | A | 6/2011 |
| JP | 2012-47871 | A | 3/2012 |
| JP | 2012-181370 | A | 9/2012 |
| JP | 2013-61617 | A | 4/2013 |
| WO | 2012043303 | A1 | 4/2012 |

OTHER PUBLICATIONS

Nishioka, et al., U.S. Appl. No. 14/296,012, filed Jun. 4, 2014.

International Preliminary Report on Patentability, International Application No. PCT/JP2013/007280, Mailing Date Jun. 25, 2015.

* cited by examiner

ELECTROPHOTOGRAPHIC MEMBER, PROCESS CARTRIDGE AND ELECTROPHOTOGRAPHIC APPARATUS

CROSS-REFERENCE TO RELATED APPLICATIONS

This application is a continuation of International Application No. PCT/JP2013/007280, filed Dec. 11, 2013, which claims the benefit of Japanese Patent Application No. 2012-272393, filed Dec. 13, 2012 and Japanese Patent Application No. 2013-254158, filed Dec. 9, 2013.

BACKGROUND OF THE INVENTION

Field of the Invention

The present invention relates to an electrophotographic member for use in an electrophotographic apparatus, and a process cartridge and an electrophotographic apparatus having the electrophotographic member.

Description of the Related Art

An electrophotographic member is used in various applications, for example, as a developer carrying member, a transfer roller, a charging roller or a cleaning blade. Such an electrophotographic member can have an electrical resistivity of $10^3$ to $10^{10}$ Ω·cm. As a method for controlling the resistance of such an electrophotographic member, for example, a measure is generally used in which an ion conductive agent is included in a resin layer of an electro-conductive roller. However, when the ion conductive agent is included in the resin layer, the ion conductive agent may leak out from the surface of the electro-conductive roller. When the ion conductive agent leaks out, the ion conductive agent may contaminate other member abutting with or adjacent to the electro-conductive roller, causing image failures.

For example, when the electro-conductive roller is a developer carrying member, the ion conductive agent that has leaked out may be attached to the surface of a photosensitive member, thereby to reduce the electrical resistance on the surface of the photosensitive member, which increases the image density corresponded to the area, and impairs the uniformity in image density.

In order to avoid such problems, a method was recently proposed in which the ion conductive agent is immobilized to the resin layer.

For example, in Japanese Patent Application Laid-Open No. 2007-297438, an electro-conductive roller in which an ion conductive agent having one hydroxyl group is used to thereby allow the ion conductive agent to be immobilized to a urethane resin was proposed.

In addition, in Japanese Patent Application Laid-Open No. 2011-118113, an electro-conductive roller in which an ion conductive agent having two hydroxyl groups is used to thereby allow the ion conductive agent to be immobilized to a urethane resin was proposed.

SUMMARY OF THE INVENTION

Recently, an electrophotographic apparatus has been demanded for outputting an image in which high image quality and high durability can be maintained even in a severer environment.

With respect to an electrophotographic member in which an ion conductive agent is immobilized to an electro-conductive layer, for example, a developer carrying member having a surface layer and an elastic layer, when the member is left to stand under a high-temperature and high-humidity environment for a long period of time, the deterioration in adhesiveness between the surface layer and the elastic layer may cause peeling off the interface between the surface layer and the elastic layer.

With respect to the developer carrying member having a surface layer and an elastic layer, for example, when a quaternary ammonium salt is immobilized to a urethane resin, the interface between the surface layer and the elastic layer may be peeled off by leaving the member to stand under a high-temperature and high-humidity environment for a long period of time. For example, even when an ion conductive agent having two hydroxyl groups is immobilized to a urethane resin via a covalent bond, the interface between the surface layer and the elastic layer may be peeled off by leaving the member to stand under a high-temperature and high-humidity environment for a long period of time. Furthermore, in comparison with the case in which an ion conductive agent having no hydroxyl group is contained, conductivity may be deteriorated.

The present invention is directed to providing an electrophotographic member having a high conductivity and also having high adhesiveness to other layer.

The present invention is directed to providing an electrophotographic apparatus that can stably output a high-quality electrophotographic image, and a process cartridge for use in the same.

The present inventors have made intensive studies for achieving the above objects. As a result, the present inventors have found that an electro-conductive layer including a resin having a structure represented by structural formula (1) has a high conductivity and also has high adhesiveness to other layer, leading to the completion of the present invention.

structural formula (1)

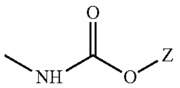

wherein, Z represents a cationic organic group having a nitrogen-containing heteroaromatic structure.

According to one aspect of the present invention, there is provided an electrophotographic member including an electro-conductive mandrel and an electro-conductive layer, wherein the electro-conductive layer has a resin having a structure represented by structural formula (1), and an anion.

It is to be noted that in the present invention, the electrophotographic member refers to conductive rollers such as a developer carrying member, a transfer roller and a charging roller, and a cleaning blade.

According to another aspect of the present invention, there is provided a process cartridge that is detachably mountable to a main body of an electrophotographic apparatus, wherein the process cartridge is provided with the electrophotographic member.

According to further aspect of the present invention, there is provided an electrophotographic apparatus including an electrophotographic photosensitive member, and a developer carrying member oppositely arranged to the electrophotographic photosensitive member for feeding a developer to the electrophotographic photosensitive member, wherein the developer carrying member is the electrophotographic member.

According to the present invention, an electrophotographic member that has a high conductivity and high interlayer adhesiveness to other layer and contributes to form a high-quality electrophotographic image can be obtained by introducing the electro-conductive layer including a resin having a structure represented by structural formula (1).

The present invention can also achieve a process cartridge and an electrophotographic apparatus that can stably form a high-quality electrophotographic image.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1A:
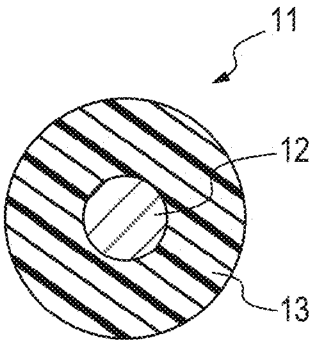
FIG. 1A is a schematic view illustrating one example of the electrophotographic member of the present invention.
Figure 1B:
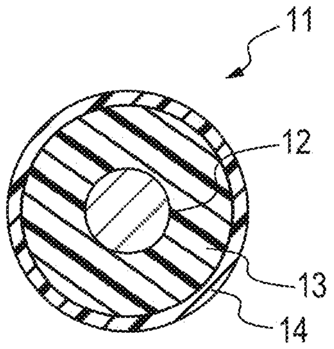
FIG. 1B is a schematic view illustrating one example of the electrophotographic member of the present invention.

One embodiment in which the electrophotographic member according to the present invention is used as an electro-conductive roller is illustrated in FIG. 1A and FIG. 1B. An electro-conductive roller 11 can be configured from, for example, an electro-conductive mandrel 12 and an elastic layer 13 provided on the circumference of the electro-conductive mandrel 12, as illustrated in FIG. 1A. In the case, the elastic layer 13 is an electro-conductive layer according to the present invention, and includes a resin having a structure represented by structural formula (1). In addition, in the electro-conductive roller 11, a resin layer 14 may be formed on the circumference of the elastic layer 13, as illustrated in FIG. 1B.

Herein, a plurality of resin layers 14 may be formed. In the case, at least one of the elastic layer 13 and the resin layers 14 includes a resin having a structure represented by structural formula (1). Herein, the outermost layer of the resin layers 14 can include a resin having a structure represented by structural formula (1).

When an aliphatic ion conductive agent such as a quaternary ammonium salt is immobilized to a urethane resin included in an electro-conductive resin layer (conductive layer) via a covalent bond, an interface between the electro-conductive layer and a layer adjacent to the electro-conductive layer may be peeled off when being left to stand under a high-temperature and high-humidity environment for a long period of time.

In addition, when the ion conductive agent is immobilized with being incorporated to the main chain of a urethane resin via a covalent bond, the interface may be peeled off as in the above case and conductivity may be deteriorated. The present inventors have made intensive studies about the problems, and as a result, have found that it is important that the electro-conductive layer have a resin having a structure represented by structural formula (1), and an anion. Then, the present inventors have therefore found that an unexpected effect of enabling adhesiveness between the electro-conductive layer and a layer adjacent to the electro-conductive layer to be made higher and also enabling conductivity to be made higher is achieved.

<Reason for Enhancement in Conductivity>

The reason is not clear, but the present inventors presume as follows.

First, the reason why high conductivity is achieved is described. It is considered that when the ion conductive agent is immobilized into the main chain of a polymer via a covalent bond, the degree of freedom (mobility) of the ion conductive agent in the electro-conductive layer tends to be reduced.

On the contrary, in the present invention, since a cation moiety of the ion conductive agent is immobilized to the terminal of a polymer molecular chain included in the electro-conductive layer, the ion conductive agent in the electro-conductive layer is hardly restrained by the polymer molecular chain and the degree of freedom of the ion conductive agent is thus secured, as compared with a case where the ion conductive agent is immobilized into the main chain. The reason why high conductivity can be realized in the present invention is presumed, as above.

Herein, the state where the ion conductive agent is immobilized into the main chain of a polymer refers to a state where the ion conductive agent is connected via a covalent bond to an intermediate portion of polymer chain formed out of repetitions of a polyol and a polyisocyanate, for example, in the case of the urethane resin. In addition, the state where the ion conductive agent is immobilized to the terminal of a molecular chain refers to a state where a single connecting point in the ion conductive agent and the terminal of a polymer chain formed out of repetitions of a polyol and a polyisocyanate are connected via a covalent bond, for example, in the case of the urethane resin.

<Reason for Enhancement in Adhesiveness>

Next, the reason why adhesiveness between the electro-conductive layer and a layer adjacent to the electro-conductive layer is enhanced is described below. However, the detail is not clear because such an enhancement in adhesiveness is found as an unexpected effect. First, it is considered that when the terminal of a polymer molecular chain included in the electro-conductive layer has a cationic organic group represented by structural formula (1), the degree of freedom of the organic group is easily secured from the same reason as described above. Therefore, it is considered that when the electro-conductive layer is formed, the organic group is present in the vicinity of the surface of the electro-conductive layer in larger numbers. Meanwhile, a resin is present in the state where molecular chains are generally entangled with one another and optionally cross-linked.

Therefore, when a resin layer is provided so as to be adjacent to the electro-conductive layer according to the present invention, the cationic organic group present in the vicinity of the surface of the electro-conductive layer is partially incorporated into an entanglement or a crosslinked structure of molecular chains in the resin layer. That is, it is considered that one anchor effect is exerted by the cationic organic group. It is thus presumed that the electrophotographic member of the present invention can maintain high adhesiveness even when being left to stand under a high-temperature and high-humidity environment for a long period of time.

It is to be noted that Comparative Example 1, in which a nitrogen-containing heteroaromatic structure included in structural formula (1) is replaced with an aliphatic structure, does not achieve the effect of enhancing adhesiveness. It is considered from such a result in Comparative Example 1 that the nitrogen-containing heteroaromatic structure included in structural formula (1), namely, a rigid structure as compared with an aliphatic structure has a key factor for strongly exerting an anchor effect.

<Reason why Toner Sticking can be Suppressed>

The present inventors have also found that, in addition to high adhesiveness and high conductivity, another unexpected effect of enabling tackiness (tack) of the surface of the electrophotographic member to be reduced to thereby suppress toner sticking on the surface is achieved.

Herein, the toner sticking refers to the following phenomenon.

When an electro-conductive roller is used as a developer carrying member, the developer carrying member is arranged in an electrophotographic apparatus as follows. The developer carrying member, the surface thereof being coated with a toner, is arranged so that the axis of an image carrying member is parallel with the axis of the developer carrying member, and is mounted so as to abut with the image carrying member at a predetermined pressure. Such a phenomenon that the developer carrying member is left to stand in such a state under a high-temperature and high-humidity environment for a long period of time to allow a toner to be sticked on the surface of the developer carrying member is called toner sticking.

The present inventors presume, as follows, the reason why the electro-conductive layer having a resin having a structure represented by structural formula (1), and an anion can be used in the electrophotographic member to suppress toner sticking. However, the detail is not clear because the suppression in toner sticking is also found as an unexpected effect as in the case of the enhancement in adhesiveness.

First, as described in the reason for the enhancement in adhesiveness, it is considered that in the electrophotographic member of the present invention, the cationic organic group is present in the vicinity of the surface of the electro-conductive layer in larger numbers. Although the present inventors describe that the resin layer is adjacent to the electro-conductive layer to thereby produce an anchor effect, resulting in the enhancement in adhesiveness between both layers, it is considered that when a toner is adjacent to the electro-conductive layer, an anchor effect on the toner is significantly limited.

The reason for this is considered because a toner generally has a particle size of only several μm and has a substantially spherical shape, a contact area between the electro-conductive layer and a toner is thus extremely small, and therefore, even if an anchor effect is generated between the electro-conductive layer and a toner, the effect is extremely low. Such consideration seems to be similar to the fact that a hook-and-loop fastener is required to have a certain extent of junction area in order to exhibit practical adhesion force.

On the other hand, the nitrogen-containing heteroaromatic structure seems to have smaller tack derived from a molecular structure because of having a higher rigidity than an alkyl group or the like. As a factor for determining the degree of tack, the junction time is regarded in addition to the junction area. That is, it is considered that even in the case of the same junction area, a longer junction time makes tack larger.

Such consideration seems to be similar to a phenomenon that the tackiness of an adhesive tape is increased along with the increase in junction time.

Therefore, the degree of tack has a large impact on the degree of toner sticking property, and smaller tack enables toner sticking to be more suppressed. It is presumed from the above that an unexpected effect of enabling the nitrogen-containing heteroaromatic structure to produce a large anchor effect between adjacent layers and also to suppress toner sticking is achieved.

Hereinafter, a configuration of the electrophotographic member will be described based on the illustrations of FIG. 1A and FIG. 1B.

<Mandrel>

A mandrel 12 serves as an electrode and a support member of an electro-conductive roller 11 as the electrophotographic member, and is made of an electro-conductive material, for example, a metal such as aluminum or copper, or an alloy such as stainless steel; iron subjected to a plating treatment with chromium or nickel; or a synthetic resin having conductivity.

<Conductive Layer>

A case where the electrophotographic member is an electro-conductive roller, and the electro-conductive roller is configured from an electro-conductive mandrel 12 and an elastic layer 13 provided on the circumference of the electro-conductive mandrel 12, as illustrated in FIG. 1A, is shown below. In the case, the elastic layer 13 is an electro-conductive layer.

The elastic layer 13 imparts, to the electro-conductive roller, elasticity necessary for forming a nip having a predetermined width in an abutting portion of the electro-conductive roller and a photosensitive member.

The elastic layer 13 includes a resin having a structure represented by structural formula (1), and an anion.

Herein, the elastic layer 13 (conductive layer) can contain a resin obtained by reacting (A) a polyol, (B) a polyisocyanate, and (C) a salt compound of a nitrogen-containing heteroaromatic cation having one hydroxyl group, and an anion. Such a reaction can be performed to thereby further suppress the production of a by-product other than the objective resin having a structure represented by structural formula (1) and the objective anion.

<Compound Having Nitrogen-Containing Heteroaromatic Structure>

The compound having a nitrogen-containing heteroaromatic structure is a salt made of a cation and an anion. The cation has one hydroxyl group, and the hydroxyl group can be located at the terminal. The cation has a nitrogen-containing heteroaromatic structure. The cation has one hydroxyl group and the hydroxyl group is located at the terminal, thereby enabling the nitrogen-containing heteroaromatic structure to be immobilized to the terminal of a polymer molecular chain. Specific examples of such a cation include one having a pyrimidine ring, a pyrazole ring, an imidazole ring, a pyridine ring, a pyrazine ring or a pyridazine ring in a molecule. The nitrogen-containing heteroaromatic structure may be substituted with a substituent having no hydroxyl group, in addition to a substituent having a hydroxyl group.

The substituent is preferably a substituent having a rigid (rigid) structure, and particularly preferably an alkyl group or a benzyl group from the viewpoint of suppressing the increase in tack. Furthermore, when the substituent is an alkyl group, the alkyl group can have 4 or less carbon atoms.

Specific examples include 2-(hydroxymethyl)-3-methyl-pyrimidin-3ium, 1-(hydroxymethyl)-2-methyl-pyrazol-2ium and 1-methyl-2-hydroxymethyl-pyrrol-1ium.

In general, an ion conductive agent having an imidazole ring structure or a pyridine ring structure has a high conductivity. Therefore, the cationic organic group represented by Z in structural formula (1) can be a group having at least one structure selected from the group consisting of an imidazole ring structure and a pyridine ring structure. Specifically, for example, a cationic organic group having a structure derived from a compound having each of imidazole ring structures represented by the following structural formulae (2) to (4), or a cationic organic group having a structure derived from a compound having each of pyridine ring structures represented by the following structural formulae (5) to (7) can be particularly suitably used.

structural formula (2)

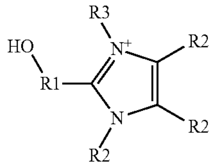

structural formula (3)

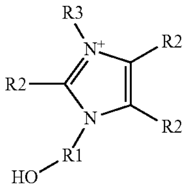

structural formula (4)

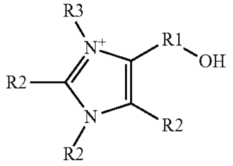

structural formula (5)

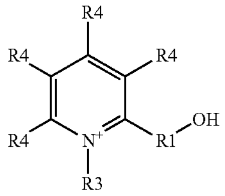

structural formula (6)

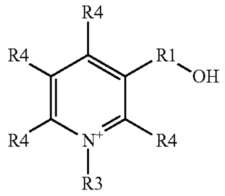

-continued structural formula (7)

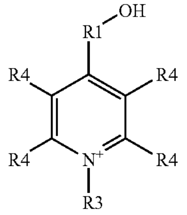

In the structural formulae (2) to (7), R1(s) each represent a linear or branched alkylene group having 4 or less carbon atoms.

R2(s) may be the same or different, and each represent a hydrogen atom, a benzyl group, or a linear or branched alkyl group having 6 or less carbon atoms.

R3(s) each represent a linear or branched alkyl group having 4 or less carbon atoms.

R4(s) may be the same or different, and each represent a hydrogen atom, or a linear or branched alkyl group having 6 or less carbon atoms.

In addition, the nitrogen-containing heteroaromatic cation having one hydroxyl group can be at least one cation selected from the group consisting of an imidazolium cation and a pyridinium cation.

Specific examples of a compound (imidazolium cation) according to the present invention, which produces a cationic organic group having an imidazole ring structure, and which has an imidazole ring structure and one hydroxyl group, include 1-methyl-2-hydroxymethyl-imidazol-1ium, 2-(2-hydroxyethyl)-imidazol-1ium, 1,2-dimethyl-imidazole-4-(hydroxymethyl)-1ium, 1-ethyl-2butyl-4-(2-hydroxyethyl)-3imidazol-1ium, 1-benzyl-2hydroxymethyl-4-ethyl-imidazol-4ium, 1-ethyl-3-(3-hydroxybutyl)-imidazol-1ium, 1-(2-hydroxyethyl)-3methyl-imidazol-3ium and 1-(2-hydroxyethyl)-2,3dimethyl-imidazol-3ium.

Specific examples of a compound (pyridinium cation) according to the present invention, which produces a cationic organic group having a pyridine ring structure, and which has a pyridine ring structure and one hydroxyl group, include 1-methyl-2(2-hydroxyethyl)pyridin-1ium, 1-ethyl-3 (2-hydroxyethyl)-pyridin-1ium, 1-methyl-4(2-hydroxyethyl)-pyridin-1ium, 1-methyl-4hydroxymethyl-pyridin-1ium, 1-methyl-4(2-hydroxyisobutyl)-pyridin-1ium and 1,5diethyl-2(2-hydroxyethyl)-pyridin-1ium.

<Anion>

The anion is not particularly limited, and examples thereof include a trifluoromethanesulfonyl ion, a pentafluoroethanesulfonyl ion, a bis(fluorosulfonyl)imide ion, a bis (trifluoromethanesulfonyl)imide ion: TFSI and a bis(fluorosulfonyl)imide: FSI. In particular, the anion can be a bis (fluorosulfonyl)imide ion.

<(A) Polyol>

The polyol is not particularly limited, and examples thereof include a polyester polyol and a polyether polyol. Examples of the polyether polyol include polyethylene glycol, polypropylene glycol and polytetramethylene glycol. In addition, examples of the polyester polyol include polyester polyols obtained by a condensation reaction of a diol component such as 1,4-butanediol, 3-methyl-1,4-pentanediol or neopentyl glycol, or a triol component such as trimethylol propane, with a dicarboxylic acid such as adipic acid, phthalic anhydride, terephthalic acid or hexahydroxyphthalic acid.

The polyether polyol and the polyester polyol may be a prepolymer if necessary subjected to chain extending by an isocyanate such as 2,4-tolylene diisocyanate (TDI), 1,4diphenylmethane diisocyanate (MDI) or isophorone diisocyanate (IPDI) in advance.

<(B) Polyisocyanate>

The isocyanate compound to be reacted with the compound having one hydroxyl group and a nitrogen-containing heteroaromatic structure and the polyol are not particularly limited, and aliphatic polyisocyanates such as ethylene diisocyanate and 1,6-hexamethylene diisocyanate (HDI), alicyclic polyisocyanates such as isophorone diisocyanate (IPDI), cyclohexane1,3-diisocyanate and cyclohexane1,4-diisocyanate, aromatic isocyanates such as 2,4-tolylene diisocyanate, 2,6-tolylene diisocyanate (TDI), 4,4'-diphenylmethane diisocyanate (MDI), polymeric diphenylmethane diisocyanate, xylylene diisocyanate and naphthalene diisocyanate, and copolymers, isocyanurate compounds, TMP adduct compounds, biuret compounds and block compounds thereof can be used therefor.

In particular, aromatic isocyanates such as tolylene diisocyanate, diphenylmethane diisocyanate and polymeric diphenylmethane diisocyanate are more suitably used.

When the above material is used for the elastic layer 13, a known resin other than a polyurethane resin may also be further added, if necessary, to such an extent that the effects of the present invention are not impaired. The resin that can be added is not particularly limited, and for example, an epoxy resin, a urea resin, an ester resin, an amide resin, an imide resin, an amideimide resin, a phenol resin, a vinyl resin, a silicone resin or a fluororesin may be contained.

The content of such a component can be 20% by mass or less based on 100% by mass of the polyurethane resin in terms of the present invention. For example, a filler, a softener, a processing aid, a tackifier, an antitack agent or a foaming agent that is commonly used as a compounding agent for resin can be further added to such an extent that the effects of the present invention are not impaired.

The amount of the compound having one hydroxyl group and a nitrogen-containing heteroaromatic structure compounded based on 100 parts by mass of the polyurethane resin is not particularly limited, but can be in the range from 0.01 parts by mass to 5 parts by mass. When the amount is 0.01 parts by mass or more, conductivity is excellent, and when the amount is 5 parts by mass or less, adhesiveness to other layer is particularly excellent.

With respect to the mixing ratio of the isocyanate compound to be reacted to the total of the number of hydroxyl groups in the polyol and the number of hydroxyl groups in the compound having one hydroxyl group and a nitrogen-containing heteroaromatic structure, the ratio of the number of isocyanate groups to the total of the numbers of hydroxyl groups in the respective molecules, assumed to be 1.0, (hereinafter, also referred to as "the ratio of NCO group/OH group") can be in the range from 1.0 to 2.0.

As the method for providing the elastic layer on the mandrel, a known method can be used on the electro-conductive roller. Examples thereof include a method including co-extruding a base material and a material for elastic layer formation and molding them, and, in the case of a liquid material for elastic layer formation, a method including injecting the liquid material to a mold in which a cylindrical pipe, a piece disposed on both ends of the pipe, for supporting a base material, and the base material are disposed, and heating and curing the liquid material.

Herein, the electro-conductive roller can also be configured so that the resin layer 14 is formed on the circumference of the elastic layer 13 as illustrated in FIG. 1B. A plurality of the resin layers 14 may be formed. In the case, while the electro-conductive layer of the electrophotographic member of the present invention can be one or more layers selected from the group consisting of the elastic layer 13 and the resin layers 14, at least the case where the electro-conductive layer of the electrophotographic member of the present invention is the outermost layer can be adopted because the effect of suppressing toner sticking is achieved.

In particular, when the resin layer 14 includes the resin having a structure represented by structural formula (1) and the anion, the elastic layer 13 may have, in addition to the above-described material, the following: an ethylene-propylene-diene-copolymerized rubber (EPDM), an acrylonitrile-butadiene rubber (NBR), a chloroprene rubber (CR), a natural rubber (NR), an isoprene rubber (IR), a styrene-butadiene rubber (SBR), a fluororubber, a silicone rubber, an epichlorohydrin rubber, hydrogenated NBR or a urethane rubber. Such rubbers can be used singly or as a mixture of two or more.

In particular, a silicone rubber can be adopted from the viewpoints of compression set and flexibility. Examples of the silicone rubber include polydimethylsiloxane, polytrifluoropropylsiloxane, polymethylvinylsiloxane and polyphenylvinylsiloxane, and copolymers of the polysiloxanes.

Various additives such as a conductivity imparting agent, a non-conductive filler, a crosslinking agent and a catalyst are appropriately compounded in the elastic layer 13.

As the conductivity imparting agent, carbon black; an electro-conductive metal such as aluminum or copper; fine particles of an electro-conductive metal oxide such as zinc oxide, tin oxide or titanium oxide; or an ion conductive agent such as a quaternary ammonium salt can be used.

Examples of the non-conductive filler include silica, quartz powder, titanium oxide, zinc oxide or calcium carbonate.

The crosslinking agent is not particularly limited, and examples thereof include tetraethoxysilane, di-t-butylperoxide, 2,5-dimethyl-2,5-di(t-butylperoxy)hexane or dicumyl peroxide.

<Resin Layer>

The resin layer 14 can include the resin having a structure represented by structural formula (1) and the anion, and when a plurality of resin layers are present, in particular, the outermost layer can include the resin having a structure represented by structural formula (1) and the anion.

When the electrophotographic member has the elastic layer 13, a known resin other than the resin having a structure represented by structural formula (1) can be further used as a resin for forming the resin layer 14, and is not particularly limited, but examples include the following: an epoxy resin, a urea resin, an ester resin, an amide resin, an imide resin, an amideimide resin, a phenol resin, a vinyl resin, a silicone resin and a fluororesin.

A filler, a conducting agent, a softener, a processing aid, a tackifier, an antitack agent, a foaming agent or the like that is commonly used as a compounding agent for resin can be further added to such an extent that the effects of the present invention are not impaired.

When irregularities are required to be formed on the surface of the electrophotographic member like the developer carrying member, fine particles for controlling roughness may be added to the outermost layer of the resin layer 14. The fine particles for controlling roughness can have a volume average particle size of 3 to 20 μm. In addition, the amount of the fine particles added to the outermost layer can be 1 to 50 parts by mass based on 100 parts by mass of the resin solid content of the outermost layer. As the fine particles for controlling roughness, fine particles of a polyurethane resin, a polyester resin, a polyether resin, a polyamide resin, an acrylic resin or a phenol resin can be used.

The method for forming the resin layer 14 is not particularly limited, and examples thereof include spray, dipping or roll-coating method using a coating material. A dip-coating method in which a coating material is over-flown from the upper end of a dipping tank, described in Japanese Patent Application Laid-Open No. 57-5047, is simple and excellent in production stability as the method for forming the resin layer.

(Process Cartridge and Electrophotographic Apparatus)

Figure 2:
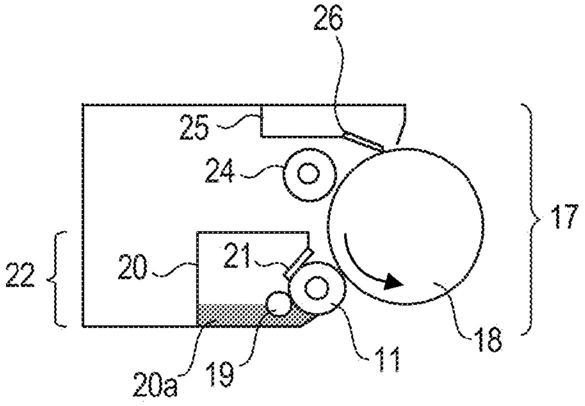
FIG. 2 is a schematic configuration view illustrating one example of the process cartridge of the present invention.

FIG. 2 is a cross-sectional view of one example of a process cartridge in which the electrophotographic member of the present invention is used as the developer carrying member. A process cartridge 17 illustrated in FIG. 2, in which a developing apparatus 22, an electrophotographic photosensitive member 18, a cleaning blade 26, a waste toner storing container 25 and a charging roller 24 are integrally supported, is detachably mountable to the main body of an electrophotographic apparatus. The developing apparatus 22 has an electro-conductive roller 11 as the electrophotographic member (used as the developer carrying member), a toner feeding roller 19, a toner container 20 and a developing blade 21. The toner container 20 is filled with a toner 20*a*.

Herein, the developing apparatus 22 may be detachably mountable. The toner 20*a* is fed to the surface of the electro-conductive roller 11 by the toner feeding roller 19, and a layer of the toner 20*a*, having a predetermined thickness, is formed on the surface of the electro-conductive roller 11 by the developing blade 21.

Figure 3:
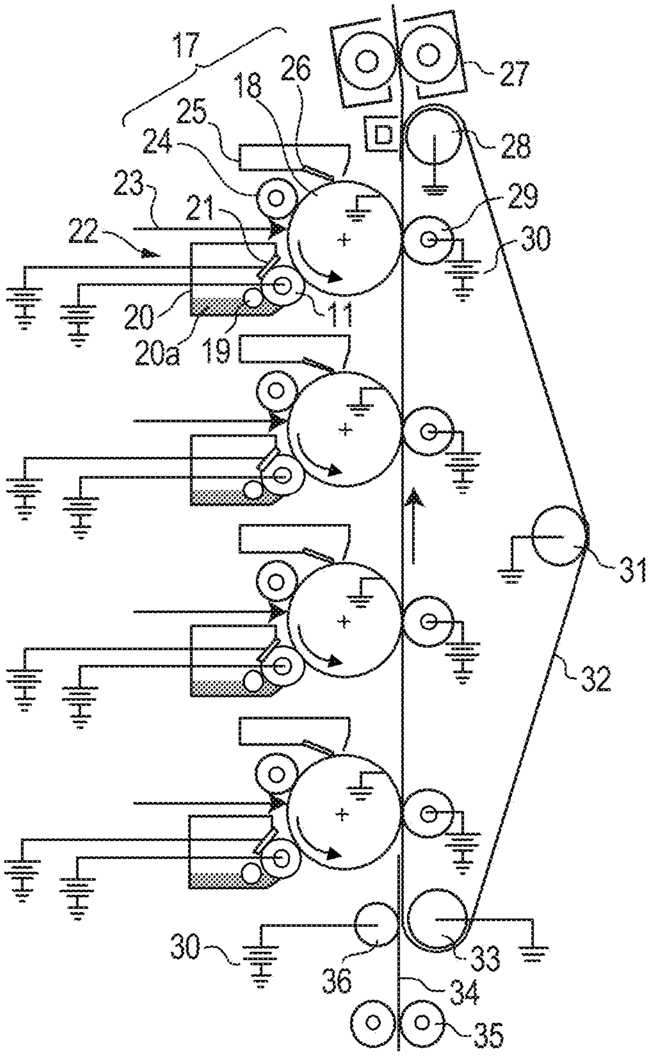
FIG. 3 is a schematic configuration view illustrating one example of the electrophotographic apparatus of the present invention.

FIG. 3 is a cross-sectional view of one example of an electrophotographic apparatus in which the electrophotographic member of the present invention is used as the developer carrying member. A developing apparatus having an electro-conductive roller 11 as the electrophotographic member (used as the developer carrying member), a toner feeding roller 19, a toner container 20 and a developing blade 21 are mounted to the electrophotographic apparatus of FIG. 3 in a detachably mountable manner. In addition, a process cartridge 17 having an electrophotographic photosensitive member 18, a cleaning blade 26, a waste toner storing container 25 and a charging roller 24 is mounted in a detachably mountable manner.

In addition, the electrophotographic photosensitive member 18, the cleaning blade 26, the waste toner storing container 25 and the charging roller 24 may also be provided on the main body of the electrophotographic apparatus. The electrophotographic photosensitive member 18 is rotated in the arrow direction and uniformly charged by the charging roller 24, and an electrostatic latent image is formed on the surface of the member by exposure light 23. The toner 20*a* is imparted by the electro-conductive roller 11 like an electrophotographic member arranged in contact with the electrophotographic photosensitive member 18 and the electrostatic latent image is developed as a toner image.

The development is performed as so-called reversal development in which the toner image is formed on an exposed portion. The toner image developed on the electrophotographic photosensitive member 18 is transferred to paper 34 as a recording medium by a transfer roller 29 as a transferring member. The paper 34 is fed into the apparatus via a paper feeding roller 35 and an adsorbing roller 36, and then conveyed into a space between the electrophotographic photosensitive member 18 and the transfer roller 29 by an endless belt-like transfer conveyance belt 32. The transfer conveyance belt 32 is operated by a driven roller 33, a driving roller 28 and a tension roller 31. A voltage is applied from a bias power source 30 to the transfer roller 29 and the adsorbing roller 36. The paper 34 on which the toner image is transferred is subjected to a fixing treatment by a fixing apparatus 27, and then discharged to the outside of the apparatus. Thus, a printing operation is terminated.

Meanwhile, a transfer residual toner that is not used in the transfer and remains on the electrophotographic photosensitive member 18 is scraped by the cleaning blade 26, and then stored in the waste toner storing container 25. The electrophotographic photosensitive member 18 cleaned is repeatedly subjected to the above operation.

The developing apparatus 22 includes the toner container 20 storing the toner 20*a* as a one-component developer, and the electro-conductive roller 11 as the developer carrying member positioned at an opening portion extending in the longitudinal direction in the toner container 20 and oppositely disposed to the electrophotographic photosensitive member 18. The developing apparatus 22 is configured so that the electrostatic latent image on the electrophotographic photosensitive member 18 is developed.

EXAMPLES

Hereinafter, the present invention will be further described with reference to specific Examples, but the present invention is not limited to the following Examples.

Synthesis of Compound Z-1

A 200 cc reactor was equipped with a stirrer, a thermometer, a dropping funnel and a calcium chloride tube. The reactor was charged with 11.0 parts by mass (0.1 mol) of nitrogen-containing heteroaromatic compound I-1 (2-hydroxymethylpyrimidine) (produced by Santa Cruz Biotechnology, Inc.) and 20 cc of toluene. The temperature of the reaction solution in the reactor was adjusted so as to be 30 to 35° C., and 15.6 parts by mass (0.11 mol) of alkyl halide compound X-1 (iodomethane) (produced by Kishida Chemical Co., Ltd.) was dropped to the reaction solution over 10 minutes while the reaction solution being stirred.

Thereafter, the reaction was performed for 3 hours, and the solvent in the resulting reaction mixture was distilled off under reduced pressure, providing reaction product 1. To the resulting reaction product 1, 50 ml of purified water was added and the resultant was stirred for 1 hour.

Then, 28.8 parts by mass (0.1 mol) of ionic compound Y-1 (lithium bis(trifluoromethanesulfonyl)imide) (produced by Kishida Chemical Co., Ltd.) was dissolved in 50 ml of purified water, and the resultant was stirred for 1 hour.

Then, the above two aqueous solutions were mixed and the mixture was stirred for 3 hours. After the mixing and stirring, the mixture was left to stand overnight to thereby separate two layers from each other, an aqueous layer, in which lithium iodide as a by-product of the reaction was dissolved, as an upper layer liquid, and an oil layer containing compound Z-1, as a lower layer liquid. A separation funnel was used to recover the oil layer, and then the oil layer recovered was repeatedly subjected to extraction by purified water and filtration twice, removing lithium iodide remaining in the oil layer. The above method was performed to provide compound Z-1.

TABLE 1-1

| Nitrogen-containing heteroaromatic compound | |
|---|---|
| I-1 | 2-(Hydroxymethyl)pyrimidine (produced by Santa Cruz Biotechnology, Inc.) |
| I-2 | 1-(Hydroxymethyl)1H pyrazole (produced by Nowa Pharmaceuticals, Co., Ltd.) |
| I-3 | 1-(4-Hydroxybutyl)imidazole (produced by Creenchem Institute) |
| I-4 | 4-Hydroxyethylimidazole (produced by The Nippon Synthetic Chemical Industry Co., Ltd.) |
| I-5 | 4-Hydroxymethyl-2-methylimidazole (produced by The Nippon Synthetic Chemical Industry Co., Ltd.) |
| I-6 | 2-Butyl-4-hydroxyethylimidazole (produced by The Nippon Synthetic Chemical Industry Co., Ltd.) |
| I-7 | 1-Benzyl-4-hydroxymethylimidazole (produced by The Nippon Synthetic Chemical Industry Co., Ltd.) |
| I-8 | 2-Hydroxymethylimidazole (produced by The Nippon Synthetic Chemical Industry Co., Ltd.) |
| I-9 | 1-(2-Hydroxyethyl)imidazole (produced by The Nippon Synthetic Chemical Industry Co., Ltd.) |
| I-10 | 1-(2-Hydroxyethyl)2-methylimidazole (produced by The Nippon Synthetic Chemical Industry Co., Ltd.) |
| I-11 | 2-(2-Hydroxyethyl)pyridine (produced by Tokyo Chemical Industry Co., Ltd.) |
| I-12 | 3-(2-Hydroxyethyl)pyridine (produced by Tokyo Chemical Industry Co., Ltd.) |
| I-13 | 4-(2-Hydroxyethyl)pyridine (produced by Tokyo Chemical Industry Co., Ltd.) |
| I-14 | 4-Hydroxymethylpyridine (produced by Tokyo Chemical Industry Co., Ltd.) |
| I-15 | 2-(4-Pyridyl)-2propanol (produced by Tokyo Chemical Industry Co., Ltd.) |
| I-16 | 5-Ethyl-2pyridineethanol (produced by Tokyo Chemical Industry Co., Ltd.) |

TABLE 1-2

| Alkyl halide | |
|---|---|
| X-1 | Iodomethane (produced by Kishida Chemical Co., Ltd.) |
| X-2 | Iodoethane (produced by Kishida Chemical Co., Ltd.) |
| X-3 | n-Butylchloride (produced by Nacalai Tesque, Inc.) |

TABLE 1-3

| Ionic compound | |
|---|---|
| Y-1 | Lithium bis(trifluoromethanesulfonyl)imide (TFSI) (produced by Kishida Chemical Co., Ltd.) |
| Y-2 | Potassium bis(fluorosulfonyl)imide (FSI) (produced by Mitsubishi Materials Electronic Chemicals Co., Ltd.) |
| Y-3 | Lithium perchlorate (produced by Kishida Chemical Co., Ltd.) |

TABLE 2-1

| | Z-1 | Z-2 | Z-3 | Z-4 | Z-5 |
|---|---|---|---|---|---|
| Nitrogen-containing heteroaromatic compound | I-1 | I-2 | I-2 | I-3 | I-4 |
| Amount added (parts by mass) | 11.0 | 9.8 | 9.8 | 14.0 | 9.8 |
| Alkyl halide | X-1 | X-1 | X-3 | X-1 | X-2 |
| Amount added (parts by mass) | 15.6 | 15.6 | 10.2 | 15.6 | 17.2 |
| Ionic compound | Y-1 | Y-1 | — | Y-1 | Y-2 |
| Amount added (parts by mass) | 28.8 | 28.8 | — | 28.8 | 21.9 |

TABLE 2-2

| | Z-6 | Z-7 | Z-8 | Z-9 | Z-10 |
|---|---|---|---|---|---|
| Nitrogen-containing heteroaromatic compound | I-5 | I-6 | I-7 | I-8 | I-9 |
| Amount added (parts by mass) | 11.2 | 15.5 | 18.8 | 9.8 | 11.2 |
| Alkyl halide | X-1 | X-2 | X-3 | X-1 | X-1 |
| Amount added (parts by mass) | 15.6 | 17.2 | 10.2 | 15.6 | 15.6 |
| Ionic compound | Y-3 | Y-1 | — | Y-1 | Y-2 |
| Amount added (parts by mass) | 11.1 | 28.8 | — | 28.8 | 21.9 |

TABLE 2-3

| | Z-11 | Z-12 | Z-13 | Z-14 | Z-15 |
|---|---|---|---|---|---|
| Nitrogen-containing heteroaromatic compound | I-10 | I-11 | I-11 | I-11 | I-12 |
| Amount added (parts by mass) | 12.6 | 12.3 | 12.3 | 12.3 | 12.3 |
| Alkyl halide | X-1 | X-1 | X-1 | X-1 | X-2 |
| Amount added (parts by mass) | 15.6 | 15.6 | 15.6 | 15.6 | 17.2 |
| Ionic compound | Y-2 | Y-1 | Y-3 | Y-2 | Y-3 |
| Amount added (parts by mass) | 21.9 | 28.8 | 11.1 | 21.9 | 11.1 |

TABLE 2-4

| | Z-16 | Z-17 | Z-18 | Z-19 |
|---|---|---|---|---|
| Nitrogen-containing heteroaromatic compound | I-13 | I-14 | I-15 | I-16 |
| Amount added (parts by mass) | 12.3 | 10.9 | 13.7 | 15.1 |
| Alkyl halide | X-1 | X-1 | X-1 | X-2 |
| Amount added (parts by mass) | 15.6 | 15.6 | 15.6 | 17.2 |
| Ionic compound | Y-3 | Y-1 | Y-1 | Y-2 |
| Amount added (parts by mass) | 11.1 | 28.8 | 28.8 | 21.9 |

Synthesis of Compounds Z-2, Z-4 to Z-7 and Z-9 to Z-19

Nitrogen-containing heteroaromatic compound species I and the amounts thereof added listed in Table 1-1, alkyl halide compound species X and the amounts thereof added listed in Table 1-2, and ionic compound species Y and the amounts thereof added listed in Table 1-3 were changed as listed in Tables 2-1 to 2-4. Compounds Z-2, Z-4 to Z-7 and Z-9 to Z-19 were obtained in the same manner as in the case of compound Z-1 except for such changes.

Synthesis of Compound Z-3

A 50 cc reactor was equipped with a stirrer, a thermometer, a dropping funnel and a calcium chloride tube. The reactor was charged with 9.8 parts by mass (0.1 mol) of nitrogen-containing heteroaromatic compound 1-2 (1H-pyrazole-1-methanol) (produced by Nowa pharmaceuticals Co., Ltd.) and 20 cc of toluene. The temperature of the reaction solution in the reactor was adjusted so as to be 30 to 35° C., and 10.2 parts by mass (0.11 mol) of alkyl halide compound X-3 (n-butylchloride) (produced by Nacalai Tesque, Inc.) was dropped to the reaction solution over 10 minutes while the reaction solution being stirred.

Thereafter, the reaction was performed for 3 hours, and the solvent in the resulting reaction mixture was distilled off under reduced pressure, providing reaction product 2. The resulting reaction product was repeatedly subjected to extraction by diethyl ether and filtration twice, removing n-butylchloride remaining in the reaction product. The above method was performed to provide compound Z-3.

Synthesis of Compound Z-8

Compound Z-8 was obtained in the same manner as in the case of compound Z-3 except that nitrogen-containing heterocyclic aromatic compound species I and the amount thereof added listed in Table 1-1, alkyl halide compound species X and the amount thereof added listed in Table 1-2, and ionic compound species Y and the amount thereof added listed in Table 1-3 were changed as listed in Table 2-2. Structural formulae (8) to (26) of compounds Z-1 to 19 obtained are shown below.

Structural formulae (8) to (26) each represent a salt compound of a nitrogen-containing heteroaromatic cation having one hydroxyl group, and an anion. Structural formulae (11) to (18) each represent a salt compound of an imidazolium cation and an anion, and structural formulae (19) to (26) each represent a salt compound of a pyridinium cation and an anion.

structural formula (8)

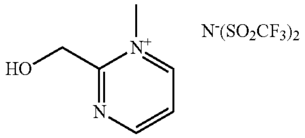

structural formula (9)

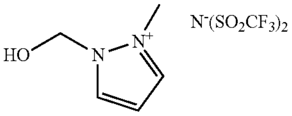

structural formula (10)

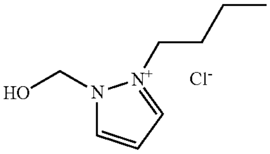

structural formula (11)

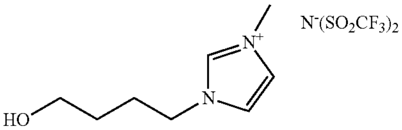

structural formula (12)

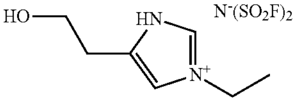

structural formula (13)

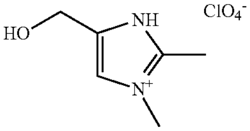

-continued structural formula (14)

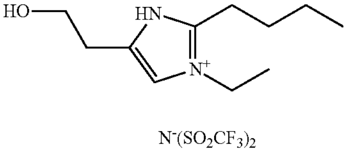

structural formula (15)

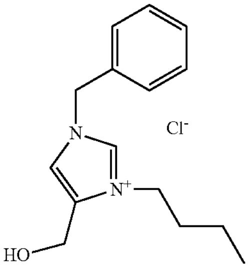

structural formula (16)

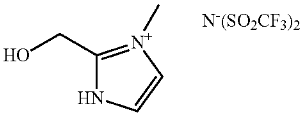

structural formula (17)

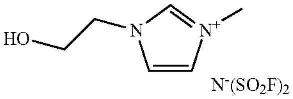

structural formula (18)

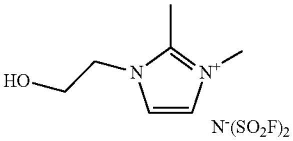

structural formula (19)

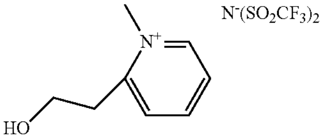

structural formula (20)

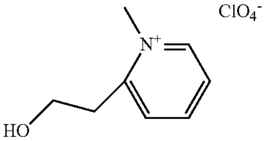

structural formula (21)

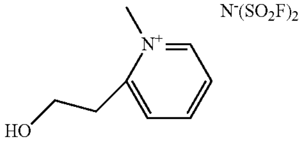

structural formula (22)

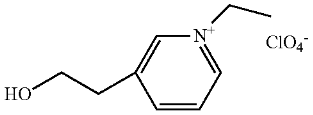

structural formula (23)

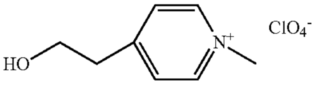

-continued structural formula (24)

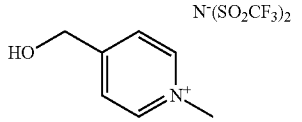

structural formula (25)

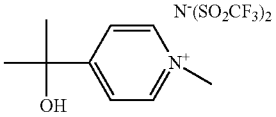

structural formula (26)

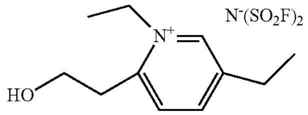

(Production of Mandrel)

As the mandrel 12, a mandrel obtained by coating a core made of SUS304, having a diameter of 6 mm, with Primer (trade name DY35-051; produced by Dow Corning Toray Co., Ltd.), and baking the resultant in an oven heated to a temperature of 180° C. for 20 minutes was prepared.

(Production of Elastic Roller D-1)

The mandrel 12 prepared above was arranged in a mold, materials listed in Table 3 were mixed and stirred, and the composition stirred was injected to a cavity formed in the mold. The mold was heated to vulcanize a urethane rubber at a temperature of 120° C. for 30 minutes for curing. A mandrel having a cured urethane rubber layer, formed on the periphery thereof, was released from the mold. Thus, elastic roller D-1 having a diameter of 12 mm, in which an elastic layer of urethane rubber was formed on the circumference of the mandrel 12, was produced. In this case, the ratio of NCO group/OH group was 1.58, and 1 part of by mass of compound Z-1 was compounded to 100 parts by mass of the solid content of the urethane resin.

TABLE 3

| | |
|---|---|
| Polyether polyol (trade name: Excenol 873; produced by Asahi Glass Co., Ltd.) | 100 parts by mass |
| Silica (trade name: Aerosil RX300; produced by Nippon Aerosil Co., Ltd.) | 6.5 parts by mass |
| TDI (trade name: Coronate T-80; produced by Nippon Polyurethane Industry Co., Ltd.) | 7.2 parts by mass |
| Dibutyltin diarylate (trade name: Neostann U-100; produced by Nitto Kasei Co., Ltd.) | 0.2 parts by mass |
| Compound Z-1 | 1.1 parts by mass |

The presence of a structure represented by the following structural formula (27) in the layer including the resin of the present invention can be confirmed by analysis using pyrolysis GC/MS, FT-IR, NMR or the like.

The polyurethane resin obtained in the present Example was analyzed using a pyrolysis apparatus (trade name: Pyrofoil Sampler JPS-700, manufactured by Japan Analytical Industry Co., Ltd.) and a GC/MS apparatus (trade name: Focus GC/ISQ, manufactured by Thermo Fisher Scientific Inc.) at a pyrolysis temperature of 580° C. with helium as a carrier gas. As a result, it was confirmed from the resulting fragment peak that the layer had a structure represented by the following structural formula (27).

structural formula (27)

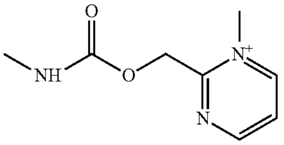

(Production of Elastic Roller D-2)

Materials in Table 4 were dispersed as liquid materials for elastic layer formation. The mandrel 12 prepared above was arranged in a mold, and the liquid materials were filled in a cavity formed in the mold and heated in an oven heated to a temperature of 140° C. for 20 minutes for curing. After the mold was cooled, a mandrel having a silicone rubber layer formed was released from the mold and heated in an oven heated to a temperature of 190° C. for 3 hours to complete a curing reaction of the silicone rubber layer. Thus, elastic roller D-2 having a diameter of 12 mm, in which an elastic layer of silicone rubber was formed on the circumference of the mandrel 12, was produced.

TABLE 4

| | |
|---|---|
| Liquid silicone rubber material (trade name: SE 6905A/B; produced by Dow Corning Toray Co., Ltd.) | 100 parts by mass |
| Carbon black (trade name: Tokablack #4300; produced by Tokai Carbon Co., Ltd.) | 15 parts by mass |

(Production of Elastic Roller D-3)

Materials in Table 5 were well kneaded, the materials kneaded were extruded on the mandrel 12 by a cross head extruder to provide elastic layer 1 of unvulcanized rubber on the mandrel 12, and heating was performed in an oven heated to a temperature of 150° C. for 50 minutes to complete a curing reaction of elastic layer 1 of unvulcanized rubber. Thus, elastic roller D-3 having a diameter of 12 mm, in which an elastic layer of hydrin rubber was formed on the circumference of the mandrel 12, was produced.

TABLE 5

| | |
|---|---|
| Epichlorohydrin-ethylene oxide-allyl glycidyl ether terpolymer (trade name: Epichlomer CG; produced by Daiso Co., Ltd.) | 100 parts by mass |
| Stearic acid (trade name: Stearic acid S; produced by Kao Corporation) | 1 part by mass |
| Calcium carbonate (trade name: Nanox #30;) produced by Maruo Calcium Co., Ltd. | 50 parts by mass |
| Plasticizer (trade name: Polycizer-W-1600; produced by DIC Corporation) | 8 parts by mass |
| Carbon black (trade name: Tokablack #7360SB; produced by Tokai Carbon Co., Ltd.) | 5 parts by mass |
| Sulfur (trade name: Sulfax 200S; produced by Tsurumi Chemical Industry Co., Ltd.) | 1.2 parts by mass |
| Dibenzothiazyl disulfide (trade name: Nocceler DM; produced by Ouchi Shinko Chemical Industrial Co., Ltd.) | 1.0 parts by mass |
| Dipentamethylene thiuram tetrasulfide (trade name: Nocceler TRA; produced by Ouchi Shinko Chemical Industrial Co., Ltd.) | 1.0 parts by mass |

(Production of Elastic Roller D-4)

With respect to elastic roller D-3 described above, the surface of the elastic layer was polished by a rotating grinding wheel so that the diameter of a central portion was 8.5 mm and each diameter at a position 90 mm away from the central portion to each of both ends was 8.4 mm, producing elastic roller D-4.

(Production of Elastic Roller D-5)

Materials shown in Table 6 were mixed by a pressure kneader to provide A-kneading rubber composition 1.

TABLE 6

| | |
|---|---|
| NBR rubber material (trade name: Nipol DN219; produced by Zeon Corporation) | 100 parts by mass |
| Carbon black (trade name: Tokablack #7360SB; produced by Tokai Carbon Co., Ltd.) | 40 parts by mass |
| Calcium carbonate (trade name: Nanox #30; produced by Maruo Calcium Co., Ltd.) | 20 parts by mass |
| Stearic acid (trade name: Stearic acid S; produced by Kao Corporation) | 1 part by mass |
| Zinc oxide | 5 parts by mass |

Furthermore, 177 parts by mass of A-kneading rubber composition 1, and materials in Table 7 were mixed in an open roll to provide unvulcanized rubber composition 1.

TABLE 7

| | |
|---|---|
| Sulfur (trade name: Sulfax 200S; produced by Tsurumi Chemical Industry Co., Ltd.) | 1.2 parts by mass |
| Tetrabenzyl thiuram disulfide (trade name: TBZTD; produced by Sanshin Chemical Industry Co., Ltd.) | 4.5 parts by mass |

The materials kneaded were extruded on the mandrel 12 by a cross head extruder to provide elastic layer 2 of unvulcanized rubber on the mandrel 12, and heating was performed in an oven heated to a temperature of 160° C. for 70 minutes to complete a curing reaction of elastic layer 2 of unvulcanized rubber. Thereafter, the surface of the elastic layer was polished by a rotating grinding wheel. Thus, elastic roller D-5 in which the diameter of a central portion in the axial direction was 8.5 mm and each diameter at a position 90 mm away from the central portion to each of left and right ends was 8.4 mm was obtained.

(Production of Coating Material for Resin Layer Formation)

Hereinafter, a method for producing each of coating materials 1 to 32 for resin layer formation, for forming the resin layer 14, will be described.

Synthesis of Polyester Polyol 1

ϵ-Caprolactone (80.4% by mass), 19.6% by mass of trimethylolpropane, and titanium tetra-n-butoxide as a catalyst were added to a glass flask equipped with a stirrer, and reacted under a nitrogen atmosphere at a temperature of 180° C. for 6 hours to provide polyester polyol 1. The hydroxyl value was 74.0 mgKOH/g.

Synthesis of Polyol A-1

TABLE 8

| |
|---|
| Polyester polyol 1 |
| Polyfunctional isocyanate (trade name: Duranate 24A100; produced by Asahi Kasei Chemicals Corporation) |
| Difunctional isocyanate (trade name: Duranate D101; produced by Asahi Kasei Chemicals Corporation) |

First, a polyfunctional isocyanate and a difunctional isocyanate listed in Table 8 were mixed so that the ratio of the polyfunctional isocyanate to the difunctional isocyanate compounded (mass ratio), 24A100:D101, was 0.38:0.62, providing a mixture of the isocyanates. Then, the mixture of the isocyanates and polyester polyol 1 listed in Table 8 were compounded so that the ratio of the number of hydroxyl groups in polyester polyol 1 to the number of isocyanate groups in the mixture of the isocyanates, OH:NCO, was 2:1. The resultant was vigorously stirred at a temperature of 100° C. for 6 hours to provide hydroxyl group terminal polyol A-1 having a hydroxyl value of 34.0 mgKOH/g.

Synthesis of Polyol A-2

A mixture of 201.9 parts by mass (2.8 mol) of dry tetrahydrofuran and 103.3 g (1.2 mol) of dry 3-methyltetrahydrofuran (molar mixing ratio: 70/30) was kept at a temperature of 10° C. in a reaction container, 13.1 g of 70% by mass perchloric acid and 120 g of acetic anhydride were added thereto, and a reaction was performed for 4 hours. Then, the reaction mixture was poured into 600 g of an aqueous 20% by mass sodium hydroxide solution for purification. Furthermore, the remaining water and solvent component were removed under reduced pressure to provide liquid hydroxyl group terminal polyol A-2. The number average molecular weight was 3000, and the hydroxyl value was 37.0 mgKOH/g.

(Polyol A-3)

The following polyether polyol was used as hydroxyl group terminal polyol A-3.

Trifunctional polyether polyol (trade name: Excenol 230 produced by Asahi Glass Co., Ltd.)

Synthesis of Isocyanate Group Terminal Prepolymer B-1

TABLE 9

| |
|---|
| Polyester polyol 1 |
| Polyfunctional isocyanate (trade name: Duranate 24A100; produced by Asahi Kasei Chemicals Corporation) |
| Difunctional isocyanate (trade name: Duranate D101; produced by Asahi Kasei Chemicals Corporation) |

First, a polyfunctional isocyanate and a difunctional isocyanate listed in Table 9 were mixed so that the ratio of the polyfunctional isocyanate to the difunctional isocyanate compounded (mass ratio), 24A100:D101, was 0.38:0.62, providing a mixture of the isocyanates. Then, the mixture of the isocyanates and polyester polyol 1 listed in Table 9 were compounded so that the ratio of the number of hydroxyl groups in the polyester polyol to the number of isocyanate groups in the mixture of the isocyanates, OH:NCO, was 1:2. The resultant was vigorously stirred at a temperature of 100° C. for 6 hours to provide isocyanate group terminal prepolymer B-1 having an isocyanate group content of 4.5% by mass.

Synthesis of Isocyanate Group Terminal Prepolymer B-2

Under a nitrogen atmosphere, 100 parts by mass of polyol A-2 was gradually dropped to 19.7 parts by mass of polymeric MDI (trade name: Millionate MR200, produced by Nippon Polyurethane Industry Co., Ltd.) in a reaction container while the temperature in the reaction container being kept at 65° C.

After completion of the dropping, the reaction was performed at a temperature of 65° C. for 2 hours. The resulting reaction mixture was cooled to room temperature to provide isocyanate group terminal prepolymer B-2 having an isocyanate group content of 4.2% by mass.

Synthesis of Isocyanate Group Terminal Prepolymer B-3

Under a nitrogen atmosphere, 100 parts by mass of polypropylene glycol, in which propylene oxide was added to glycerin, having a molecular weight of 1000 (trade name: Excenol 1030 produced by Asahi Glass Co., Ltd.) was gradually dropped to 25 parts by mass of diphenylmethane diisocyanate in a reaction container while the temperature in the reaction container being kept at 65° C.

After completion of the dropping, the reaction was performed at a temperature of 65° C. for 2 hours. The resulting reaction mixture was cooled to room temperature to provide isocyanate group terminal prepolymer B-3 having an isocyanate group content of 4.2% by mass.

(Preparation of Coating Material 1)

Materials listed in Table 10 below, as materials for the resin layer 14, were stirred and mixed with 314.5 parts by mass of isocyanate group terminal prepolymer B-1.

TABLE 10

| | |
|---|---|
| Polyol A-1 | 262.6 parts by mass |
| Carbon black (trade name: MA100; produced by Mitsubishi Chemical Corporation) | 65.9 parts by mass |
| Urethane resin fine particle (trade name: Art Pearl C-400; produced by Negami Chemical Industrial Co., Ltd.) | 83.8 parts by mass |

Then, methyl ethyl ketone (hereinafter, also referred to as "MEK") was added so that the total solid content ratio was 30% by mass, and thereafter the resultant was mixed in a sand mill. Then, furthermore, the viscosity was adjusted by MEK so as to be 10 to 13 cps, preparing coating material 1 for resin layer formation. In this case, the ratio of NCO group/OH group was 1.2.

(Preparation of Coating Material 2)

Materials listed in Table 11, as materials for the resin layer 14, were stirred and mixed with 366.4 parts by mass of isocyanate group terminal prepolymer B-1.

TABLE 11

| | |
|---|---|
| Polyol A-1 | 539.9 parts by mass |
| Compound Z-1 | 4.2 parts by mass |
| Silica (trade name: Aerosil 130; produced by Nippon Aerosil Co., Ltd.) | 62.9 parts by mass |
| Urethane resin fine particle (trade name: Art Pearl C-400; produced by Negami Chemical Industrial Co., Ltd.) | 83.8 parts by mass |

In this case, the ratio of NCO group/OH group was 1.16, and the compounding ratio of compound Z-1 to 100 parts by mass of the solid content of the urethane resin was 1 part by mass.

Then, MEK was added so that the total solid content ratio was 30% by mass, and thereafter the resultant was mixed in a sand mill. Then, furthermore, the viscosity was adjusted by MEK so as to be 10 to 13 cps, preparing coating material 2 for resin layer formation.

(Preparation of Coating Materials 3 to 32)

Each of coating materials 3 to 32 was obtained in the same manner as in the case of coating material 2 except that polyol species A, isocyanate group terminal prepolymer species B, compound species Z, and, the amounts of the silica and the urethane resin fine particles compounded were changed as listed in Tables 12-1 to 12-7.

TABLE 12-1

| | Coating material-2 | Coating material-3 | Coating material-4 | Coating material-5 | Coating material-6 |
|---|---|---|---|---|---|
| Ion conductive agent | Z-1 | Z-2 | Z-2 | Z-2 | Z-3 |
| Amount added (parts by mass) | 4.2 | 4.2 | 4 | 4.4 | 4.2 |
| Amount of silica added (parts by mass) | 62.9 | 62.9 | 59.9 | 65.9 | 62.9 |
| Urethane resin fine particle (parts by mass) | 83.8 | 83.8 | 79.8 | 87.9 | 83.8 |
| Polyol | A-1 | A-1 | A-2 | A-3 | A-1 |
| Amount added (parts by mass) | 539.9 | 539.9 | 262.6 | 262.6 | 539.9 |
| Isocyanate group terminal prepolymer | B-1 | B-1 | B-2 | B-3 | B-1 |
| Amount added (parts by mass) | 366.4 | 366.4 | 242.4 | 314.5 | 366.4 |
| Ratio of NCO group/OH group | 1.16 | 1.16 | 1.32 | 1.15 | 1.12 |

TABLE 12-2

| | Coating material-7 | Coating material-8 | Coating material-9 | Coating material-10 | Coating material-11 |
|---|---|---|---|---|---|
| Ion conductive agent | Z-4 | Z-4 | Z-4 | Z-4 | Z-4 |
| Amount added (parts by mass) | 0.021 | 0.042 | 4.2 | 21 | 33.6 |
| Amount of silica added (parts by mass) | 62.9 | 62.9 | 62.9 | 66.3 | 68.8 |
| Urethane resin fine particle (parts by mass) | 83.8 | 83.8 | 83.8 | 83.8 | 83.8 |
| Polyol | A-1 | A-1 | A-1 | A-1 | A-1 |
| Amount added (parts by mass) | 539.9 | 539.9 | 539.9 | 539.9 | 539.9 |
| Isocyanate group terminal prepolymer | B-1 | B-1 | B-1 | B-1 | B-1 |
| Amount added (parts by mass) | 366.4 | 366.4 | 366.4 | 375.7 | 381.2 |
| Ratio of NCO group/OH group | 1.20 | 1.20 | 1.17 | 1.07 | 1.01 |

TABLE 12-3

| | Coating material-12 | Coating material-13 | Coating material-14 | Coating material-15 | Coating material-16 |
|---|---|---|---|---|---|
| Ion conductive agent | Z-4 | Z-4 | Z-5 | Z-6 | Z-7 |
| Amount added (parts by mass) | 4 | 4.4 | 4.2 | 4.4 | 4.2 |
| Amount of silica added (parts by mass) | 59.9 | 65.9 | 62.9 | 65.9 | 62.9 |
| Urethane resin fine particle (parts by mass) | 79.8 | 87.9 | 83.8 | 87.9 | 83.8 |
| Polyol | A-2 | A-3 | A-1 | A-3 | A-1 |
| Amount added (parts by mass) | 262.6 | 262.6 | 539.9 | 262.6 | 539.9 |
| Isocyanate group terminal prepolymer | B-2 | B-3 | B-1 | B-3 | B-1 |
| Amount added (parts by mass) | 242.4 | 314.5 | 366.4 | 314.5 | 366.4 |
| Ratio of NCO group/OH group | 1.33 | 1.16 | 1.15 | 1.12 | 1.17 |

TABLE 12-4

| | Coating material-17 | Coating material-18 | Coating material-19 | Coating material-20 | Coating material-21 |
|---|---|---|---|---|---|
| Ion conductive agent | Z-8 | Z-9 | Z-10 | Z-11 | Z-12 |
| Amount added (parts by mass) | 4 | 4 | 4.2 | 4.4 | 4.2 |
| Amount of silica added (parts by mass) | 59.9 | 59.9 | 62.9 | 65.9 | 62.9 |
| Urethane resin fine particle (parts by mass) | 79.8 | 79.8 | 83.8 | 87.9 | 83.8 |
| Polyol | A-2 | A-2 | A-1 | A-3 | A-1 |
| Amount added (parts by mass) | 262.6 | 262.6 | 539.9 | 262.6 | 539.9 |
| Isocyanate group terminal prepolymer | B-2 | B-2 | B-1 | B-3 | B-1 |
| Amount added (parts by mass) | 242.4 | 242.4 | 366.4 | 314.5 | 366.4 |
| Ratio of NCO group/OH group | 1.28 | 1.34 | 1.15 | 1.14 | 1.16 |

TABLE 12-5

| | Coating material-22 | Coating material-23 | Coating material-24 | Coating material-25 | Coating material-26 |
|---|---|---|---|---|---|
| Ion conductive agent | Z-13 | Z-14 | Z-15 | Z-16 | Z-17 |
| Amount added (parts by mass) | 4 | 4.4 | 4 | 4.2 | 4 |
| Amount of silica added (parts by mass) | 59.9 | 65.9 | 59.9 | 62.9 | 59.9 |
| Urethane resin fine particle (parts by mass) | 79.8 | 87.9 | 79.8 | 83.8 | 79.8 |
| Polyol | A-2 | A-3 | A-2 | A-1 | A-2 |
| Amount added (parts by mass) | 262.6 | 262.6 | 262.6 | 539.9 | 262.6 |
| Isocyanate group terminal prepolymer | B-2 | B-3 | B-2 | B-1 | B-2 |
| Amount added (parts by mass) | 242.4 | 314.5 | 242.4 | 366.4 | 242.4 |
| Ratio of NCO group/OH group | 1.27 | 1.14 | 1.28 | 1.13 | 1.33 |

TABLE 12-6

| | Coating material-27 | Coating material-28 | Coating material-29 | Coating material-30 | Coating material-31 |
|---|---|---|---|---|---|
| Ion conductive agent | Z-18 | Z-19 | Z-4 | Z-10 | Z-12 |
| Amount added (parts by mass) | 4.4 | 4.2 | 4.2 | 4.2 | 4.2 |
| Amount of silica added (parts by mass) | 65.9 | 62.9 | 62.9 | 62.9 | 62.9 |
| Urethane resin fine particle (parts by mass) | 87.9 | 83.8 | 0 | 0 | 0 |
| Polyol | A-3 | A-1 | A-1 | A-1 | A-1 |
| Amount added (parts by mass) | 262.6 | 539.9 | 539.9 | 539.9 | 539.9 |
| Isocyanate group terminal prepolymer | B-3 | B-1 | B-1 | B-1 | B-1 |
| Amount added (parts by mass) | 314.5 | 366.4 | 366.4 | 366.4 | 366.4 |
| Ratio of NCO group/OH group | 1.16 | 1.16 | 1.17 | 1.15 | 1.16 |

TABLE 12-7

| | Coating material-32 |
|---|---|
| Ion conductive agent | Z-17 |
| Amount added (parts by mass) | 4 |
| Amount of silica added (parts by mass) | 59.9 |
| Urethane resin fine particle (parts by mass) | 0 |
| Polyol | A-2 |
| Amount added (parts by mass) | 262.6 |
| Isocyanate group terminal prepolymer | B-2 |
| Amount added (parts by mass) | 242.4 |
| Ratio of NCO group/OH group | 1.33 |

Example 1

Hereinafter, the method for producing the electrophotographic member will be described.

Elastic roller D-1 previously produced was dipped in coating material 1 for resin layer formation, and a coat of the coating material was formed on the surface of the elastic layer of elastic roller D-1, and dried. The coat was further heat-treated in an oven heated to a temperature of 130° C. for 1 hour to thereby provide a resin layer of about 15 μm on the circumference of the elastic layer, producing an electrophotographic member according to Example 1.

The electrophotographic member produced was evaluated with respect to the following items. The evaluation results obtained are shown in Table 19 below.

[Measurement of Current Value Flowing in Electrophotographic Member]

The measurement of the current value flowing in the resulting electrophotographic member was performed by the following method.

Figure 4:
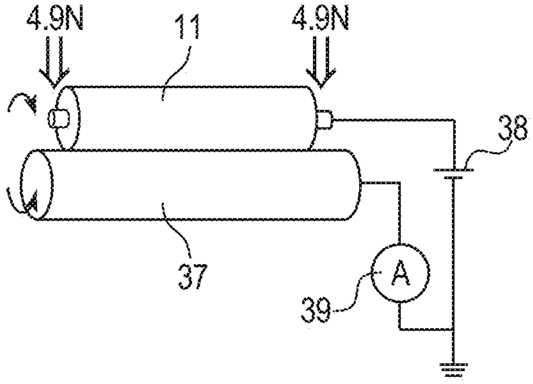
FIG. 4 is a schematic configuration view of an apparatus for measuring a current value of an electro-conductive roller as one example of the electrophotographic member of the present invention.

As illustrated in FIG. 4, a load of 4.9 N was applied on an exposed portion of the mandrel at each of both ends of an electrophotographic member (conductive roller) 11 to allow the circumference surface of the electrophotographic member 11 to abut with a cylindrical electrode 37 made of SUS, having a diameter of 40 mm. The cylindrical electrode 37 was rotated in such a state, and the electrophotographic member 11 followed the rotation to be rotated at a speed of 24 rpm in the circumferential direction. When the rotation was stabilized, a voltage of 50 V was applied to a portion between the cylindrical electrode 37 and the electrophotographic member 11 by a DC power source 38. Herein, a measurement environment of a temperature of 23° C. and a humidity of 55% RH was adopted. The current value at the time was measured by an ammeter 39 over a lap of the electrophotographic member 11, and the average value thereof was determined to be defined as the current value flowing in the electrophotographic member 11.

[Evaluation of Peel-Off of Surface Layer, and Measurement of Peeling Strength]

The evaluation of peel-off of the surface layer under a high-temperature severe environment was performed by the following method. Herein, the surface layer refers to the outermost layer of the electrophotographic member.

The electrophotographic member according to Example 1 was left to stand under an environment of an ambient temperature of 40° C. and a relative humidity of 95% RH for days. Thereafter, the electrophotographic member was left to stand at room temperature for 3 hours, and a cut of 10 mm×50 mm was made at each of both ends of the electrophotographic member. The electrophotographic member was horizontally secured, and the load when the surface layer was vertically pulled from the corner of the cut at a speed of 10 mm/min and forcedly peeled off was measured by a load cell. The measurement was performed at each of both ends of the electrophotographic member three times, and the average value of six values in total was defined as the peeling strength.

Then, the surface peeled off was observed. Excluding a portion broken within the resin layer, the elastic layer or the surface layer (cohesive failure), the peel-off of the surface layer was evaluated according to the following criteria.

TABLE 13

| | |
|---|---|
| A | No peel-off was observed at interface between surface layer and resin layer or elastic layer |
| B | Peel-off of interface between surface layer and resin layer or elastic layer was observed in a range of 20% or less in surface peeled off, but member could be used without any problem |
| C | Peel-off of interface between surface layer and resin layer or elastic layer was observed in most or the entire of surface peeled off |

Example 2

An electrophotographic member according to Example 2 was produced in the same manner as in Example 1 except that elastic roller D-2 and coating material 2 were used instead of elastic roller D-1 and coating material 1, respectively. The resulting electrophotographic member was evaluated by the same evaluation methods as in Example 1. The evaluation results obtained are shown in Table 19 below.

Example 3

An electrophotographic member according to Example 3 was produced by further coating the electrophotographic member according to Example 2 with coating material 1, and drying and heating the resultant, in the same manner as in Example 1. Herein, the electrophotographic member was made of two of the resin layers 14, and had the layer having the resin according to the present invention in an intermediate between the elastic layer and the outermost layer. The resulting electrophotographic member was evaluated by the same evaluation methods as in Example 1. The evaluation results obtained are shown in Table 19 below.

Comparative Examples

Synthesis of Compound C-1

Fifty ml of purified water was added to 14.6 parts by mass (0.1 mol) of 2-hydroxyethyl triethylammonium iodide W-1 (produced by Sigma Aldrich), and the resultant was stirred for 1 hour. Then, 11.1 parts by mass (0.1 mol) of ionic compound Y-3, perchloric acid lithium (produced by Kishida Chemical Co., Ltd.), was dissolved in 50 ml of purified water, and the resultant was stirred for 1 hour. Then, the two aqueous solutions were mixed, and stirred for 3 hours. After the mixing and stirring, the mixture was left to stand overnight to thereby separate two layers from each other, an aqueous layer, in which lithium iodide as a by-product of the reaction was dissolved, as an upper layer liquid, and an oil layer containing compound C-1, as a lower layer liquid. A separation funnel was used to recover the oil layer, and then the oil layer recovered was repeatedly washed with purified water twice, removing a small amount of lithium iodide remaining in the oil layer. The above method was performed to provide compound C-1.

Synthesis of Compounds C-2 and C-3

Each of compounds C-2 and C-3 was obtained in the same manner as in the case of compound C-1 except that ionic compound species Y listed in Table 14-1 and nitrogen-containing compound species W listed in Table 14-2 compounded were changed as listed in Table 15.

TABLE 14-1

| Ionic compound | |
|---|---|
| Y-1 | Lithium bis(trifluoromethanesulfonyl)imide (TFSI) (produced by Kishida Chemical Co., Ltd.) |
| Y-2 | Potassium bis(fluorosulfonyl)imide (FSI) (produced by Mitsubishi Materials Electronic Chemicals Co., Ltd.) |
| Y-3 | Lithium perchlorate (produced by Kishida Chemical Co., Ltd.) |

TABLE 14-2

| Nitrogen-containing compound | |
|---|---|
| W-1 | 2-Hydroxyethyl triethylammonium iodide (produced by Sigma Aldrich) |
| W-2 | Bis(2-hydroxyethyl)-methyl-dodecylammonium bromide (produced by Nanjing Qite Chemical Technology Co., Ltd.) |
| W-3 | 1-Ethyl 3-methylimidazolium bromide (produced by Wako Pure Chemical Industries, Ltd.) |

TABLE 15

| Compound | C-1 | C-2 | C-3 |
|---|---|---|---|
| Nitrogen-containing compound | W-1 | W-2 | W-3 |
| Amount added (parts by mass) | 14.6 | 40.0 | 19.1 |
| Ionic compound | Y-3 | Y-2 | Y-1 |
| Amount added (parts by mass) | 11.1 | 21.9 | 28.8 |

(Production of Elastic Roller D-6)

The mandrel 12 previously prepared was arranged in a mold, materials listed in Table 16 were mixed, and a composition stirred was injected in a cavity formed in the mold. The mold was heated to vulcanize a urethane rubber at a temperature of 120° C. for 30 minutes for curing. A mandrel having a urethane rubber layer cured, formed on the periphery thereof, was released from the mold. Thus, elastic roller D-6 having a diameter of 12 mm, in which an elastic layer of urethane rubber was formed on the circumference of the mandrel 12, was produced. Herein, the ratio of NCO group/OH group was 1.53. In addition, 1 part of by mass of compound C-1 was compounded to 100 parts by mass of the solid content of a urethane resin.

TABLE 16

| | |
|---|---|
| Polyether polyol (trade name: Excenol 873; produced by Asahi Glass Co., Ltd.) | 100 parts by mass |
| Silica (trade name: Aerosil RX300; produced by Nippon Aerosil Co., Ltd.) | 6.5 parts by mass |
| TDI (trade name: Coronate T-80; produced by Nippon Polyurethane Industry Co., Ltd.) | 7.2 parts by mass |
| Dibutyltin diarylate (trade name: Neostan U-100; produced by Nitto Kasei Co., Ltd.) | 0.2 parts by mass |
| Compound C-1 | 1.1 parts by mass |

(Preparation of Coating Material 33)

Materials listed in Table 17 below, as materials for the resin layer 14, were stirred and mixed with 366.4 parts by mass of isocyanate group terminal prepolymer B-1.

TABLE 17

| | |
|---|---|
| Polyol A-1 | 539.9 parts by mass |
| Compound C-1 | 4.2 parts by mass |
| Silica (trade name: Aerosil RX300; produced by Nippon Aerosil Co., Ltd.) | 62.9 parts by mass |
| Urethane resin fine particle (trade name: Art Pearl C-400; produced by Negami Chemical Industrial Co., Ltd.) | 83.8 parts by mass |

Then, MEK was added so that the total solid content ratio was 30% by mass, and thereafter the resultant was mixed in a sand mill. Then, furthermore, the viscosity was adjusted by MEK so as to be 10 to 13 cps, preparing coating material 33 for surface layer formation.

(Preparation of Coating Materials 34 to 38)

Each of coating materials 34 to 38 was obtained as in the case of coating material 33 except that polyol species A, isocyanate group terminal prepolymer species B, compound C, and, the amounts of the silica and the urethane resin fine particles compounded were changed as listed in Tables 18-1 to 18-2.

TABLE 18-1

| | Coating material-33 | Coating material-34 | Coating material-35 |
|---|---|---|---|
| Compound C | C-1 | C-2 | C-3 |
| Amount added (parts by mass) | 4.2 | 4.4 | 4.0 |
| Amount of silica added (parts by mass) | 62.9 | 65.9 | 59.9 |
| Urethane resin fine particle (parts by mass) | 83.8 | 87.9 | 79.8 |
| Polyol | A-1 | A-3 | A-2 |
| Amount added (parts by mass) | 539.9 | 262.6 | 262.6 |
| Isocyanate group terminal prepolymer | B-1 | B-3 | B-2 |
| Amount added (parts by mass) | 366.4 | 314.5 | 242.4 |
| Ratio of NCO group/OH group | 1.20 | 1.17 | 1.28 |

TABLE 18-2

| | Coating material-36 | Coating material-37 | Coating material-38 |
|---|---|---|---|
| Compound C | C-1 | C-2 | C-3 |
| Amount added (parts by mass) | 4.2 | 4.4 | 4.0 |
| Amount of silica added (parts by mass) | 62.9 | 65.9 | 59.9 |
| Urethane resin fine particle (parts by mass) | 0 | 0 | 0 |
| Polyol | A-1 | A-3 | A-2 |
| Amount added (parts by mass) | 539.9 | 262.6 | 262.6 |
| Isocyanate group terminal prepolymer | B-1 | B-3 | B-2 |
| Amount added (parts by mass) | 366.4 | 314.5 | 242.4 |
| Ratio of NCO group/OH group | 1.20 | 1.17 | 1.28 |

Comparative Example 1

An electrophotographic member according to Comparative Example 1 was produced in the same manner as in Example 1 except that elastic roller D-6 was used instead of elastic roller D-1.

Comparative Example 2

An electrophotographic member according to Comparative Example 2 was produced in the same manner as in Example 1 except that elastic roller D-2 and coating material 33 were used instead of elastic roller D-1 and coating material 1, respectively.

Comparative Example 3

An electrophotographic member according to Comparative Example 3 was produced by further coating the electrophotographic member according to Comparative Example with coating material 1, and drying and heating the resultant, in the same manner as in Comparative Example 1. Each of the electrophotographic members according to Comparative Examples 1 to 3 was evaluated by the same evaluation methods as in Example 1. The evaluation results obtained are shown in Table 20 below.

TABLE 19

| Example | Current value (μA) | Peel-off of resin layer | Peeling strength (N) |
|---|---|---|---|
| 1 | 360 | B | 1.6 |
| 2 | 510 | B | 1.7 |
| 3 | 450 | B | 1.7 |

TABLE 20

| Comparative Example | Current value (μA) | Peel-off of resin layer | Peeling strength (N) |
|---|---|---|---|
| 1 | 350 | C | 0.9 |
| 2 | 505 | C | 0.8 |
| 3 | 430 | C | 0.9 |

*In Comparative Examples 1 to 3, the interface between the elastic layer and the resin layer was peeled off.

Since each of the members in Examples 1 to 3 had a structure represented by structural formula (1) in at least one of the elastic layer and the resin layer, high adhesiveness between the elastic layer and the resin layer, or between the two resin layers, and high conductivity of the elastic layer or the resin layer were found.

On the contrary, in each of the members in Comparative Examples 1 to 3 having no structure represented by structural formula (1), peel-off was observed at the interface between the elastic layer and the resin layer due to the ion conductive agent included in the resin.

<Developer Carrying Member>

Then, examples in which the electrophotographic member of the present invention was used as a developing roller (developer carrying member) will be described. Herein, in the developer carrying member, the outermost layer was formed by a layer including a resin having a structure represented by structural formula (1).

Example 4

In order to measure the tack of a single conductive layer, a sheet was produced as follows.

Coating material 3 was used to prepare a urethane resin sheet as follows. Coating material 3 was cast to an aluminum mold so that the film thickness was 200 μm, put on sunflower cradle (trade name: Wonder Shaker NA-4X (manufactured by Nissinrika Corp.)), and dried until fluidity was lost. Thereafter, the resultant was put on a horizontal table, dried at an ambient temperature of 23° C. for 24 hours, then heated and cured at a temperature of 140° C. for 2 hours, and cooled to room temperature, and subjected to releasing from the mold, thereby producing a urethane resin sheet having a thickness of 200 μm.

The resulting urethane resin sheet was used for performing the evaluations with respect to the following items. The evaluation results obtained are shown in Table 23 below.

[Measurement of Tack (Surface Tackiness)]

After the urethane resin sheet produced was left to stand under an environment of an ambient temperature of 30° C. and a relative humidity of 80% RH for 24 hours, the measurement was performed.

Tacking Tester TAC-II (manufactured by Rhesca Corporation) was used as an apparatus for measuring the tack. The measurement was performed under the following conditions. The measurement was performed three times and the average value was defined as the tack value.

Contact part for measurement: probe made of SUS, having a diameter of 5 mm

Load sensor: LT25A-100

Insertion speed during contact: 30 mm/min

Pull-up speed during test: 600 mm/min

Load during contact: 60 gf

Rest time during contact: 5 seconds

Measurement environment: environment of a temperature of 30° C. and a relative humidity of 80% RH Hereinafter, the method for producing the developing roller will be described.

Elastic roller D-2 was dipped in coating material 3 for resin layer formation, and a coat of coating material 3 was formed on the surface of the elastic layer of elastic roller D-2, and dried. The coat was further heat-treated in an oven heated to a temperature of 140° C. for 1 hour to thereby provide a resin layer of about 15 μm on the circumference of the elastic layer, producing a developing roller according to Example 4. The developing roller produced, as an electrophotographic member, was evaluated with respect to [Measurement of current value flowing in electrophotographic member] and [Evaluation of peel-off of surface layer, and measurement of peeling strength] performed in Example 1, and the following items. The evaluation results obtained are shown in Table 23 below.

[Measurement of Toner Sticking Density]

The evaluation of the toner sticking density under a high-temperature and high-humidity environment was performed by the following method.

The developing roller according to Example 4 was mounted to a yellow toner cartridge for a laser printer (trade name: LBP5300; manufactured by Canon Inc.) having a configuration illustrated in FIG. 3. The yellow toner cartridge was mounted to the laser printer. Then, the laser printer was used to output a white solid image (any image was not depicted on paper), resulting in the state where the surface of the developing roller was coated with a yellow toner. The developing roller in such a state was taken out from the yellow toner cartridge.

The developing roller was put on a flat plate made of polytetrafluoroethylene, and the developing roller was pressed on the flat plate at a load of 2.94 N (a load of 1.47 N on each of both ends of the mandrel), and left to stand under an environment of an ambient temperature of 40° C. and a relative humidity of 95% RH for 60 days. Then, the developing roller was released from the pressing on the flat plate, and left to still stand in an environment of a temperature of 25° C. and a relative humidity of 45% RH for 3 hours, and thereafter, the surface of the developing roller was air-blown.

Then, the toner sticked on the developing roller was peeled off using an adhesive tape (trade name: Mending tape; manufactured by Sumitomo 3M Limited). The adhesive tape to which the yellow toner was attached was placed on plain paper (trade name: Office 70; manufactured by Canon Inc.), and the reflection density was measured using a reflection density meter (trade name: TC-6DS/A, manufactured by Tokyo Denshoku, Co., Ltd.). As a control, an adhesive tape to which no toner was attached was placed on plain paper in the same manner, and the reflection density was measured in the same manner.

Then, the density difference between the reflection density of the adhesive tape to which no toner was attached and the reflection density of the adhesive tape to which the yellow toner was attached was determined. Furthermore, the ratio of the density difference was determined, assuming that the reflection density of the adhesive tape to which no toner was attached was 100, and the ratio was defined as the degree of reduction in reflectivity (%). The measurement was performed at three points in total, a central portion and both ends of the developing roller, and the arithmetic average value of the three values was defined as the toner sticking density of the developing roller to be evaluated.

Examples 5 to 33

Each of urethane resin sheets was produced in the same manner as in Example 4 except that each coating material in Table 21 below was used as the coating material for forming the resin layer 14. Furthermore, a urethane resin sheet using coating material 2 used in Example 2 was also produced in the same manner as in Example 4.

Then, the resulting urethane resin sheets were evaluated by the same evaluation methods as in Example 4. The evaluation results obtained are shown in Table 23 below. In addition, each of developing rollers according to Examples 5 to 33 was produced by coating each elastic roller shown in Table 21 below with each coating material for forming the resin layer 14 shown in Table 21 below, and drying and heating the resultant, in the same manner as in Example 4. Then, the resulting developing rollers and the developing roller produced in Example 2 were evaluated by the same evaluation methods as in Example 4. The evaluation results obtained are shown in Table 23 below.

TABLE 21

| Example | Coating material | Elastic roller |
|---|---|---|
| 4 | 3 | D-2 |
| 5 | 4 | D-2 |
| 6 | 5 | D-2 |
| 7 | 6 | D-2 |
| 8 | 7 | D-2 |
| 9 | 8 | D-2 |

TABLE 21-continued

| Example | Coating material | Elastic roller |
|---|---|---|
| 10 | 9 | D-2 |
| 11 | 10 | D-2 |
| 12 | 11 | D-2 |
| 13 | 12 | D-2 |
| 14 | 13 | D-2 |
| 15 | 14 | D-2 |
| 16 | 15 | D-2 |
| 17 | 16 | D-2 |
| 18 | 17 | D-2 |
| 19 | 18 | D-2 |
| 20 | 19 | D-2 |
| 21 | 20 | D-2 |
| 22 | 21 | D-2 |
| 23 | 22 | D-2 |
| 24 | 23 | D-2 |
| 25 | 24 | D-2 |
| 26 | 25 | D-2 |
| 27 | 26 | D-2 |
| 28 | 27 | D-2 |
| 29 | 28 | D-2 |
| 30 | 8 | D-3 |
| 31 | 18 | D-3 |
| 32 | 20 | D-3 |
| 33 | 27 | D-3 |

Comparative Examples 4 and 5

Each of urethane resin sheets was produced in the same manner as in Example 4 except that each coating material in Table 22 below was used as the coating material for forming the resin layer 14. Furthermore, a urethane resin sheet using coating material 33 used in Comparative Example 2 was also produced in the same manner as in Example 4.

Then, the resulting urethane resin sheets were evaluated by the same evaluation methods as in Example 4. The evaluation results obtained are shown in Table 24 below.

In addition, each of developing rollers according to Comparative Examples 4 and 5 was produced by coating each elastic roller shown in Table 22 below with each coating material for forming the resin layer 14 shown in Table 22 below, and drying and heating the resultant in the same manner as in Example 4. Then, the resulting developing rollers and the developing roller produced in Comparative Example 2 were evaluated by the same evaluation methods as in Example 4. The evaluation results obtained are shown in Table 24 below.

TABLE 22

| Comparative Example | Coating material | Elastic roller |
|---|---|---|
| 4 | 34 | D-2 |
| 5 | 35 | D-2 |

TABLE 23

| | Evaluation results | | | | |
|---|---|---|---|---|---|
| | Developing roller | | | | Urethane resin sheet |
| Example | Current value (μA) | Peel-off of resin layer | Peeling strength (N) | Toner sticking density (degree of reduction in reflectivity) (%) | Tack (gf) |
| 2 | 510 | B | 1.6 | 1.30 | 51 |
| 4 | 530 | B | 1.7 | 1.25 | 50 |

TABLE 23-continued

| Example | Evaluation results: Developing roller: Current value (μA) | Peel-off of resin layer | Peeling strength (N) | Toner sticking density (degree of reduction in reflectivity) (%) | Urethane resin sheet Tack (gf) |
|---|---|---|---|---|---|
| 5 | 560 | B | 1.7 | 1.23 | 48 |
| 6 | 1250 | B | 1.8 | 1.20 | 45 |
| 7 | 500 | B | 1.4 | 1.43 | 53 |
| 8 | 220 | B | 1.8 | 1.17 | 44 |
| 9 | 590 | A | 2.1 | 0.66 | 41 |
| 10 | 1080 | A | 2.5 | 0.53 | 40 |
| 11 | 680 | A | 2.3 | 0.62 | 42 |
| 12 | 1570 | B | 1.7 | 1.32 | 47 |
| 13 | 610 | A | 2.5 | 0.51 | 42 |
| 14 | 1380 | A | 2.4 | 0.58 | 43 |
| 15 | 570 | A | 2.5 | 0.54 | 40 |
| 16 | 540 | A | 2.3 | 0.61 | 43 |
| 17 | 640 | A | 2.0 | 0.71 | 41 |
| 18 | 600 | A | 2.2 | 0.63 | 42 |
| 19 | 1560 | A | 2.3 | 0.61 | 45 |
| 20 | 210 | A | 2.4 | 0.57 | 38 |
| 21 | 570 | A | 2.0 | 0.74 | 42 |
| 22 | 1050 | A | 2.5 | 0.53 | 37 |
| 23 | 570 | A | 2.3 | 0.63 | 42 |
| 24 | 1580 | A | 2.3 | 0.67 | 43 |
| 25 | 580 | A | 2.5 | 0.50 | 38 |
| 26 | 510 | A | 2.6 | 0.48 | 36 |
| 27 | 680 | A | 2.4 | 0.53 | 38 |
| 28 | 1420 | A | 2.0 | 0.81 | 43 |
| 29 | 570 | A | 2.3 | 0.64 | 44 |
| 30 | 560 | A | 2.4 | 0.61 | 41 |
| 31 | 1500 | A | 2.5 | 0.57 | 45 |
| 32 | 520 | A | 2.4 | 0.59 | 42 |
| 33 | 610 | A | 2.0 | 0.78 | 43 |

TABLE 24

| Comparative Example | Evaluation results: Developing roller: Current value (μA) | Peel-off of resin layer | Peeling strength (N) | Toner sticking density (degree of reduction in reflectivity) (%) | Urethane resin sheet Tack (gf) |
|---|---|---|---|---|---|
| 2 | 505 | C | 0.8 | 2.53 | 87 |
| 4 | 350 | C | 0.7 | 2.37 | 81 |
| 5 | 590 | C | 0.8 | 2.68 | 93 |

Also in Examples 4 to 33, high adhesiveness between the elastic layer and the resin layer, and high conductivity of the elastic layer or the resin layer were found as in Examples 1 to 3.

In the evaluation of each of the urethane resin sheets, the increase in tack was suppressed in Examples 2 and 4 to 33 because the urethane resin sheets had a nitrogen-containing heteroaromatic structure. Therefore, toner sticking to the developer carrying member under a high-temperature and high-humidity environment was suppressed at a high level.

On the contrary, in Comparative Examples 2, 4 and 5 in which the developing roller including no resin having a structure represented by structural formula (1) in the resin layer was used, the ion conductive agent was included in the resin and thus peel-off of the interface between the elastic layer and the resin layer was observed. In Comparative Example 4 in which the developer carrying member had two hydroxyl groups in a molecule, the increase in resistance of the ion conductive agent due to immobilization to the urethane resin was found.

Furthermore, tack of the resin was also increased in the evaluation of the urethane resin sheet, and toner sticking under a high-temperature and high-humidity environment was found.

<Charging Member>

Then, an example in which the electrophotographic member of the present invention was used as the charging roller (charging member) is described.

Example 34

A charging roller according to Example 34 was produced by coating an elastic roller listed in Table 26 below with each coating material for forming the resin layer 14 listed in Table 26 below, and drying and heating the resultant, in the same manner as in Example 1.

[Measurement of Current Value Flowing in Charging Roller]

The current value was measured in the same manner as in [Measurement of current value flowing in electrophotographic member] described in Example 1 except that the charging roller according to Example 34 was used instead of the electrophotographic member (conductive roller). The measurement environment in the case was a low-temperature and low-humidity environment of a temperature of 15° C. and a humidity of 10% RH (hereinafter, also referred to as L/L environment).

Herein, the charging roller left to stand under the L/L environment for 48 hours or more was used for measurement.

[Evaluation of Horizontal Streak-Like Image Defect]

The following evaluations were performed in order to confirm the suppression of degradation in electrical resistivity in the use of the charging roller for a long period of time and the influence by the reduction in electrical resistivity under the L/L environment (temperature: 15° C., humidity: 10% RH).

(1) Application of DC Current

As illustrated in FIG. 4, a load of 4.9 N was applied on an exposed portion of the mandrel at each of both ends of a charging roller (conductive roller) 11 to allow the circumference surface of the charging roller 11 to abut with a cylindrical electrode 37 made of SUS, having a diameter of 40 mm. The cylindrical electrode 37 was rotated in such a state, and the charging roller 11 followed the rotation to be rotated at a speed of 30 rpm in the circumferential direction. When the rotation was stabilized, a DC current of 200 μA was applied by a DC power source 38 for 30 minutes. Thereafter, the following image evaluation was performed.

(2) Image Evaluation

As the electrophotographic apparatus, an electrophotographic laser printer (trade name: Laserjet CP4525dn manufactured by Hewlett-Packard Company) was used. The charging roller according to Example 34 was incorporated to a cartridge in the electrophotographic apparatus and the image evaluation was performed. The image evaluation was performed under the L/L environment (temperature: 15° C., humidity: 10% RH) in all cases, wherein halftone images (images in which a plurality of horizontal lines each having a width of 1 dot were drawn in the axial direction of the photosensitive member with the horizontal lines being drawn at an interval of 2 dots) were output. The resulting images were evaluated according to the following criteria.

TABLE 25

| | |
|---|---|
| A | No horizontal streak-like image was observed. |
| B | A slight, horizontal streak-like white line was partially observed. |
| C | A slight, horizontal streak-like white line was entirely observed. |
| D | A heavy, horizontal streak-like white line was observed and was conspicuous. |

Examples 35 to 38

Each of charging rollers according to Examples 35 to 38 was produced by coating each elastic roller listed in Table 26 below with each coating material for forming the resin layer 14 listed in Table 26 below, and drying and heating the resultant, in the same manner as in Example 34. The resulting charging rollers were evaluated by the same evaluation methods as in Example 34. The evaluation results obtained are shown in Table 28 below.

TABLE 26

| Example | Coating material | Elastic roller |
|---|---|---|
| 34 | 29 | D-3 |
| 35 | 30 | D-3 |
| 36 | 31 | D-3 |
| 37 | 32 | D-3 |
| 38 | 29 | D-4 |

Comparative Examples 6 to 8

Each of charging rollers according to Comparative Examples 6 to 8 was produced by coating each elastic roller listed in Table 27 below with each coating material for forming the resin layer 14 listed in Table 27 below, and drying and heating the resultant, in the same manner as in Example 34. The resulting charging rollers were evaluated by the same evaluation methods as in Example 34. The evaluation results obtained are shown in Table 29 below.

TABLE 27

| Comparative Example | Coating material | Elastic roller |
|---|---|---|
| 6 | 36 | D-3 |
| 7 | 37 | D-3 |
| 8 | 38 | D-3 |

TABLE 28

| | Evaluation results | |
|---|---|---|
| Example | Current value (μA) | Horizontal streak |
| 34 | 850 | A |
| 35 | 780 | A |
| 36 | 810 | A |
| 37 | 940 | A |
| 38 | 830 | A |

TABLE 29

| | Evaluation results | |
|---|---|---|
| Comparative Example | Current value (μA) | Horizontal streak |
| 6 | 860 | D |
| 7 | 630 | C |
| 8 | 740 | C |

In each of Examples 34 to 38, since the charging roller including a resin having a structure represented by structural formula (1) in the resin layer was used, the increase in electrical resistivity during use for a long period of time was suppressed. In addition, the increase in electrical resistivity under the L/L environment was also suppressed. In addition, no horizontal streak-like image was observed in the resulting image.

On the contrary, in each of Comparative Examples 6 to 8 in which the charging roller including no resin having a structure represented by structural formula (1) in the resin layer was used, the increase in electrical resistivity during use for a long period of time and the increase in electrical resistivity under the L/L environment were found. Furthermore, in each of Comparative Examples 6 to 8, a horizontal streak-like image was also observed. Coating materials 36 to 38 used in Comparative Examples 6 to 8 were the same coating materials having a high tack value as in coating materials 33 to 35 used in Comparative Examples 2, 4 and 5 except that no urethane resin fine particles were used. Therefore, it is considered that the observation of a horizontal streak-like image in Comparative Examples 6 to 8 was associated with the increase in tack value.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-272393, filed Dec. 13, 2012, and Japanese Patent Application No. 2013-254158, filed Dec. 9, 2013, which are hereby incorporated by reference herein in their entirety.

REFERENCE SIGNS LIST

11: conductive roller
12: mandrel
13: elastic layer
14: surface layer

What is claimed is:

1. An electrophotographic member comprising:

an electro-conductive mandrel, and an electro-conductive layer comprising an anion and a polyurethane resin whose polymer molecular chain has, at the terminal thereof, a structure represented by formula (1):

(1)

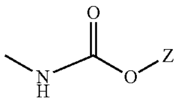

wherein Z represents a cationic organic group having at least one structure selected from the group consisting of an imidazolium cation and a pyridinium cation.

2. The electrophotographic member according to claim 1, comprising the mandrel, an elastic layer on the mandrel and a resin layer on the circumference of the elastic layer, wherein at least one of the elastic layer and the resin layer is the electro-conductive layer.

3. The electrophotographic member according to claim 1, wherein the polyurethane resin of the electro-conductive layer is a resin obtained by reacting the following (A), (B) and (C) components:

(A) a polyol, (B) a polyisocyanate, and (C) a salt compound of a nitrogen-containing heteroaromatic cation having a sole hydroxyl group and having at least one structure selected from the group consisting of an imidazolium cation and a pyridinium cation, and the anion.

4. The electrophotographic member according to claim 3, wherein the nitrogen-containing heteroaromatic cation having a sole hydroxyl group is at least one cation selected from the group consisting of an imidazolium cation and a pyridinium cation.

5. The electrophotographic member according to claim 3, wherein the nitrogen-containing heteroaromatic cation having one hydroxyl group has a structure selected from the group consisting of formulae (2) to (7):

(2)

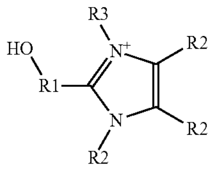

(3)

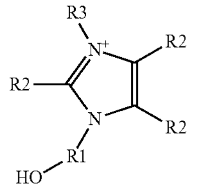

(4)

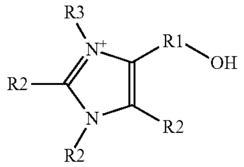

(5)

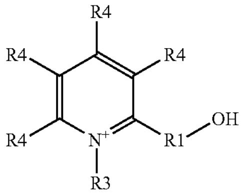

(6)

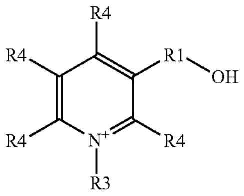

(7)

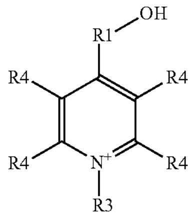

where R1(s) each represent a linear or branched alkylene group having 4 or less carbon atoms, R2(s) independently represent a hydrogen atom, a benzyl group, or a linear or branched alkyl group having 6 or less carbon atoms, R3(s) each represent a linear or branched alkyl group having 4 or less carbon atoms, R4(s) independently represent a hydrogen atom, or a linear or branched alkyl group having 6 or less carbon atoms.

6. A process cartridge, comprising a developer carrying member and being detachably mountable to a main body of an electrophotographic apparatus, wherein the developer carrying member is the electrophotographic member according to claim 1.

7. An electrophotographic apparatus comprising an electrophotographic photosensitive member; and a developer carrying member oppositely arranged to the electrophotographic photosensitive member for feeding a developer to the electrophotographic photosensitive member, wherein the developer carrying member is the electrophotographic member according to claim 1.

* * * * *